Figure 1:
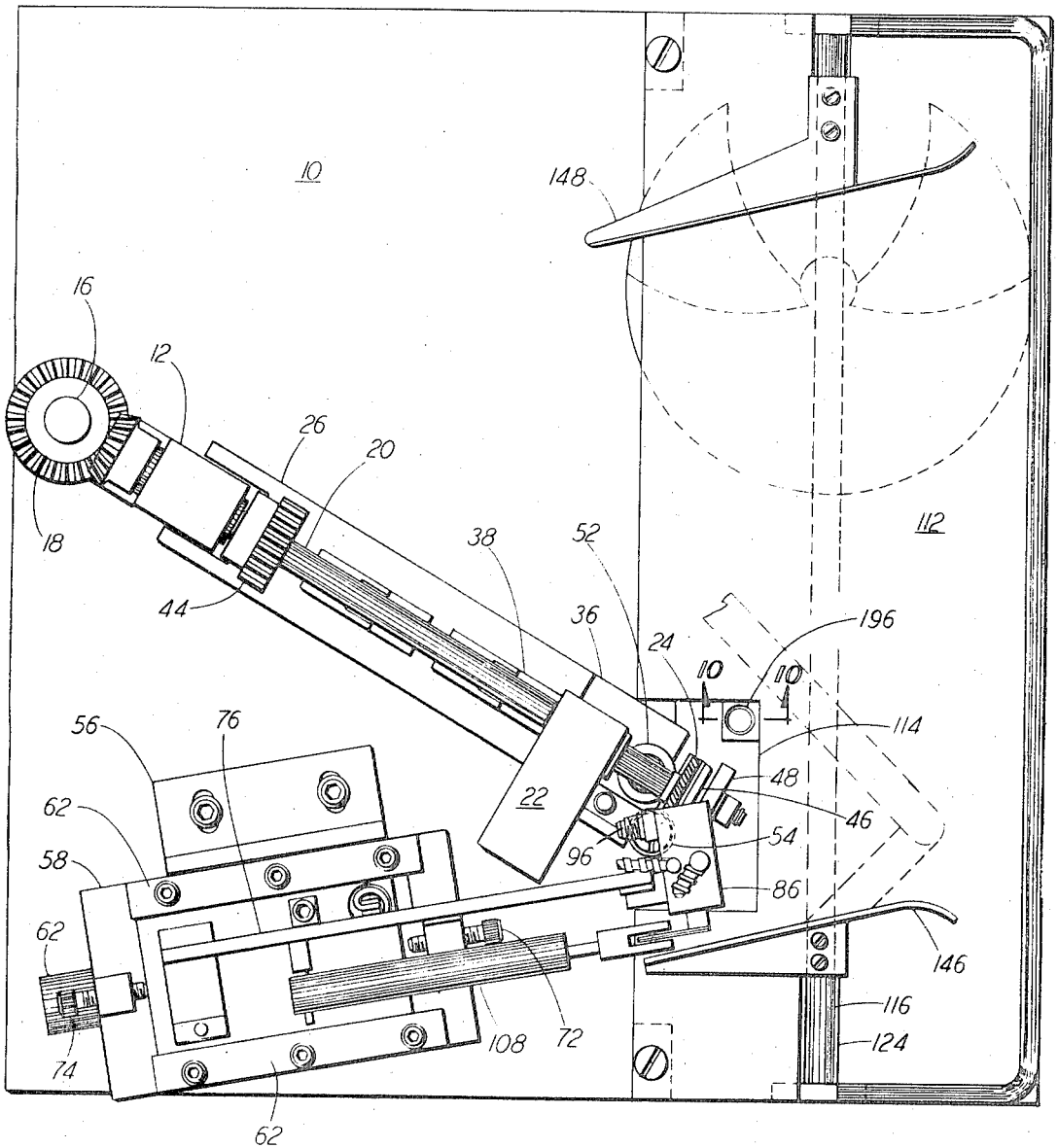

United States Patent

[11] 3,628,208

| [72] | Inventors | Wladyslaw Typrowicz;<br>Otto M. Springer, both of Belmont, Mass. |
|---|---|---|
| [21] | Appl. No. | 17,089 |
| [22] | Filed | Mar. 6, 1970 |
| [45] | Patented | Dec. 21, 1971 |
| [73] | Assignee | Jacob S. Kamborian<br>West Newton, Mass. |

[54] MACHINE FOR PERFORMING WORK ALONG A SELECTED PORTION OF THE PERIPHERY OF A WORKPIECE
56 Claims, 18 Drawing Figs.

| [52] | U.S. Cl. | 12/20, 118/8 |
|---|---|---|
| [51] | Int. Cl. | A43d 43/06 |
| [50] | Field of Search | 12/20, 10.1, 59.5; 118/8, 410 |

[56] References Cited
UNITED STATES PATENTS

| 2,979,744 | 4/1961 | Clark | 12/20 |
|---|---|---|---|
| 3,003,459 | 10/1961 | Sprague | 118/8 |
| 3,251,081 | 5/1966 | Springer | 12/10.1 |

*Primary Examiner*—Patrick D. Lawson
*Attorney*—Albert Gordon

ABSTRACT: A machine for applying a ribbon of cement along the periphery of a sole. The machine incorporates a control for feeding the sole periphery past a cement extruding nozzle and for terminating the feed and the cement extrusion after the portion of the sole periphery to be coated has moved past the nozzle, a control for changing the position of the nozzle inwardly of the sole periphery during the feeding and a control for concomitantly changing the feed speed and the rate of cement extrusion.

INVENTORS
WLADYSLAW TYPROWICZ
OTTO M. SPRINGER
BY Albert Gordon
ATTORNEY

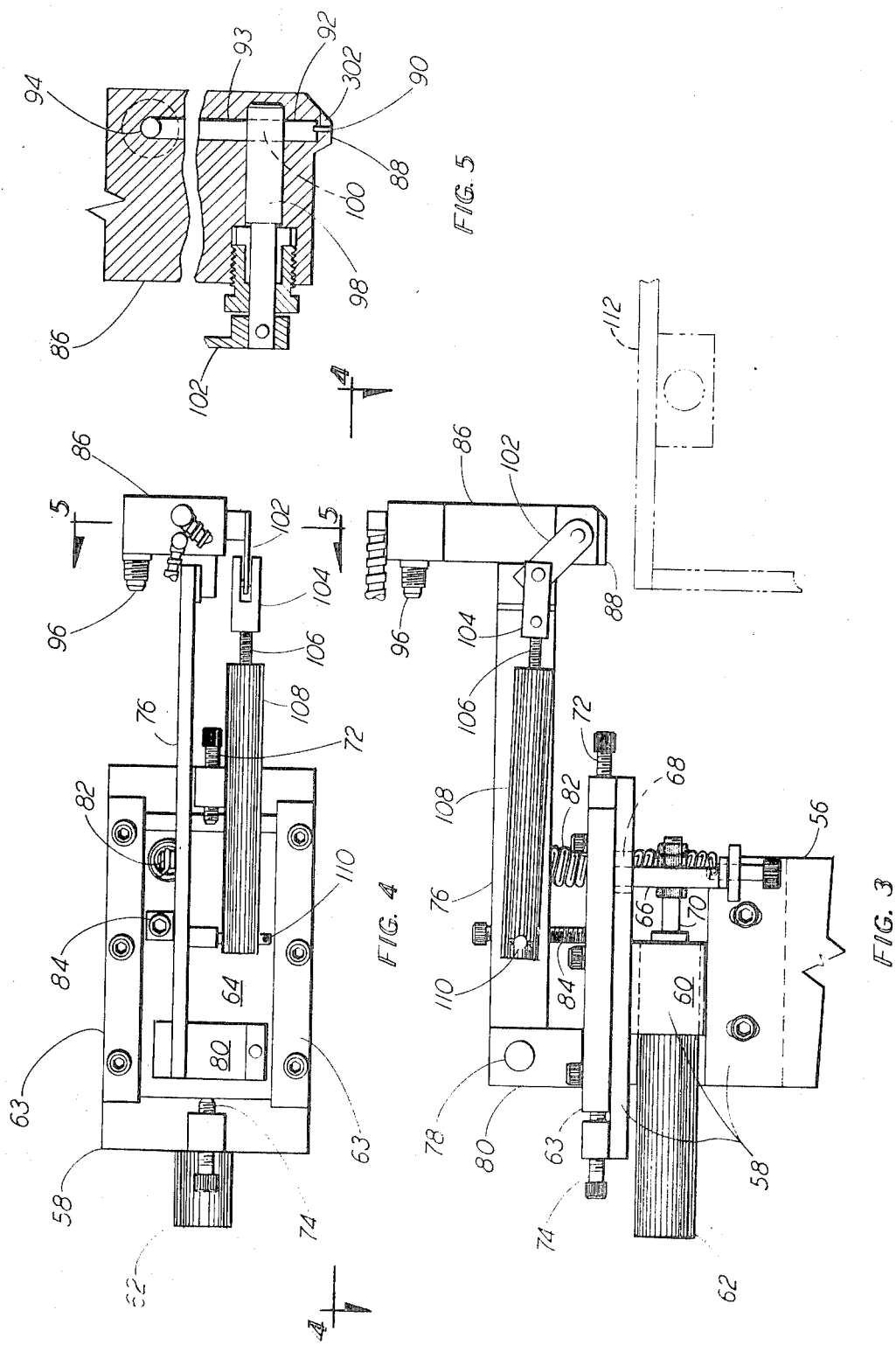

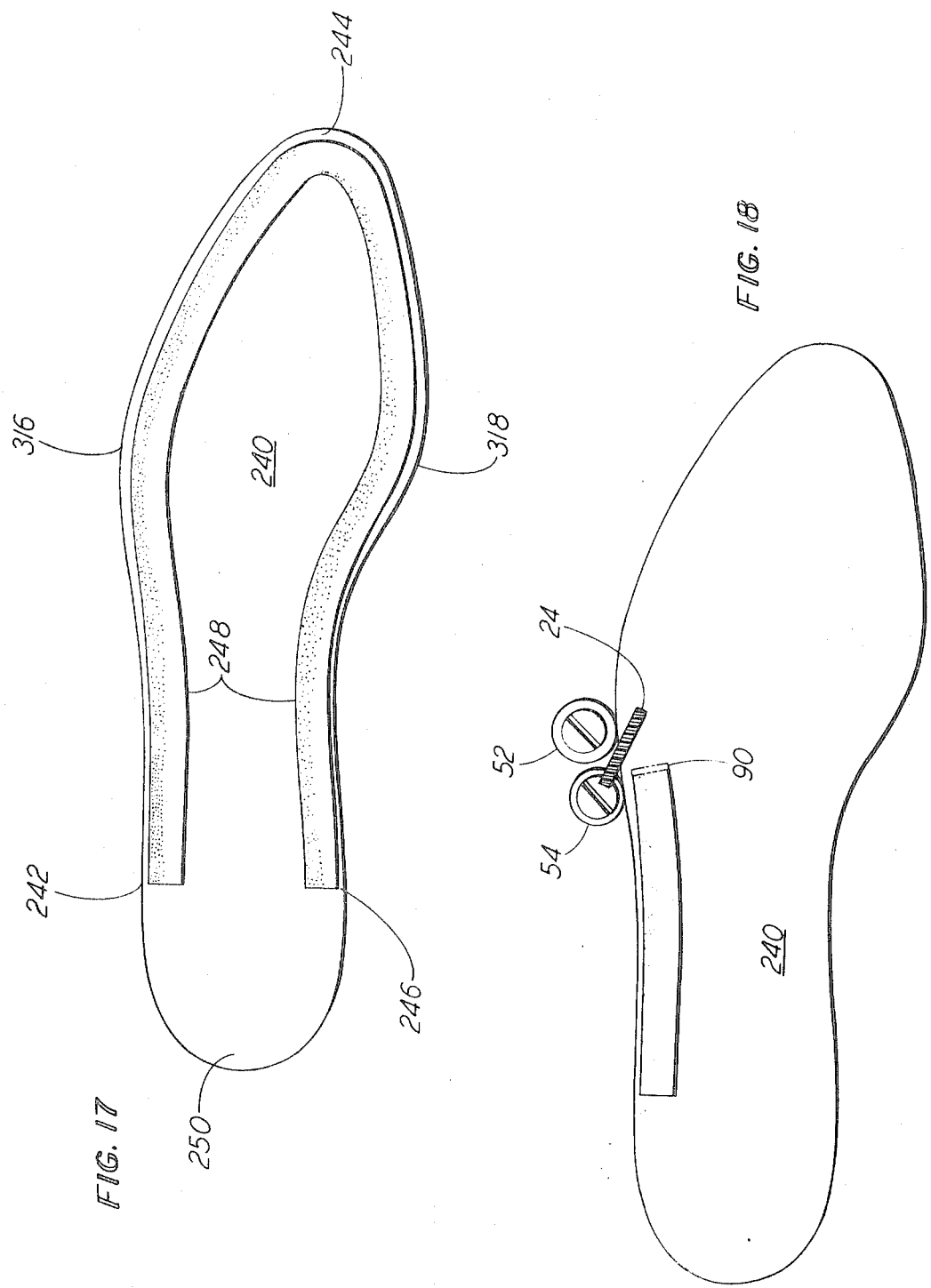

MACHINE FOR PERFORMING WORK ALONG A SELECTED PORTION OF THE PERIPHERY OF A WORKPIECE

This invention is concerned with a machine for performing work along the periphery of a selected portion of a workpiece. While the illustrative embodiment of the invention discloses the work operation to be the extrusion of cement along the periphery of a sole, in its broadest aspects the invention is not limited to this type of work. For example, the work performed may instead be the application of a welt rib to an insole to make the product disclosed in U.S. Pat. No. 3,493,983.

One object of the invention is to enable the machine to perform the work along a selected portion of the workpiece periphery regardless of the length of the workpiece. This is accomplished by imparting relative feeding movement between the workpiece periphery and a work performing instrumentality by a control mechanism which causes the feeding movement to terminate after the lapse of a period of time that is proportional to the length of the workpiece.

Another object of the invention is to enable the work to be performed different distances inwardly of the workpiece periphery during the relative feeding movement. This is accomplished by incorporating a control mechanism in the machine that moves the instrumentality different distances inwardly of the workpiece periphery during the relative feeding movement.

Another object of the invention is to change the feed speed during the relative feeding movement so that the speed is slowed down when a portion of the workpiece periphery having a relatively small radius of curvature is moved past the instrumentality. This is accomplished by incorporating in the machine a control mechanism that changes the feed speed during the relative feeding movement.

While all of the aforementioned control mechanisms are disclosed in the illustrative embodiment of the invention as being incorporated in a single machine, it should be understood that each of the control mechanisms and the objects accomplished thereby has utility apart from the other control mechanisms.

Figure 2:
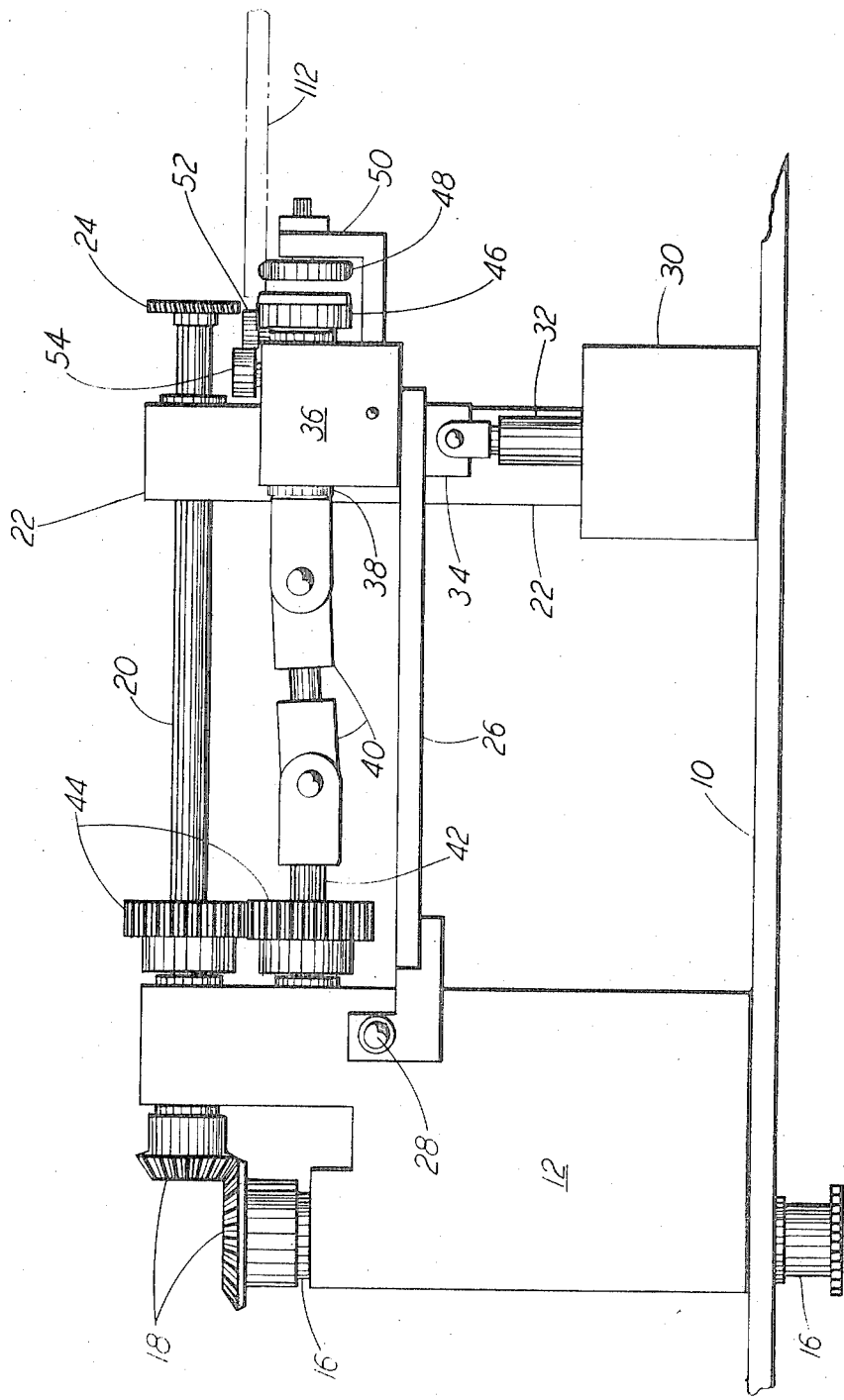
Figure 7:
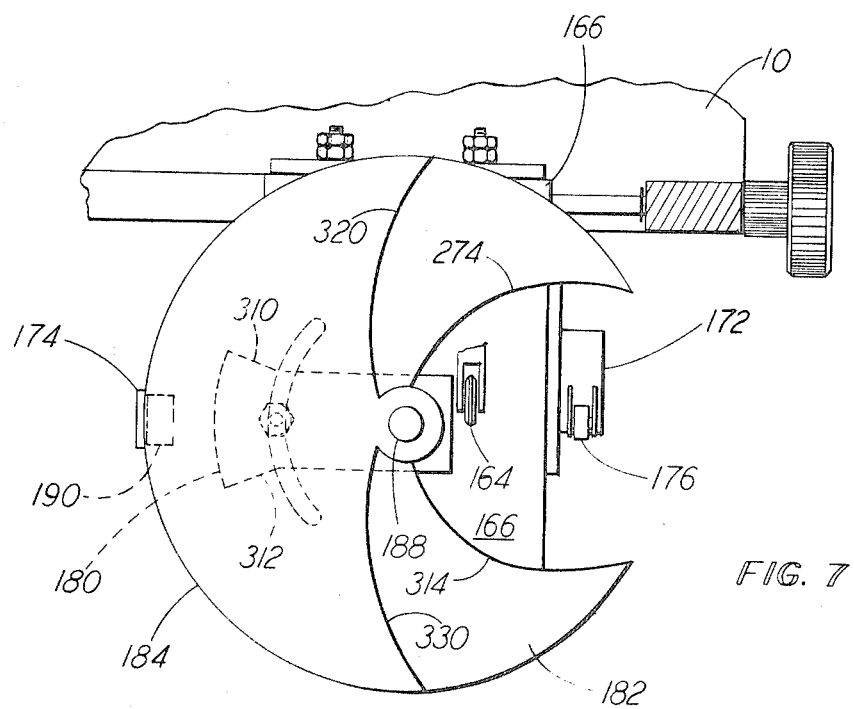
Figure 6:
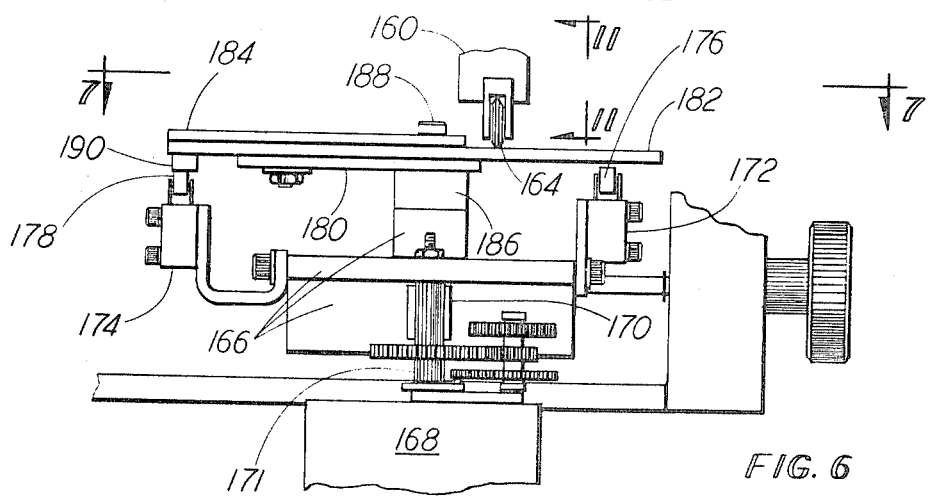
Figure 8:
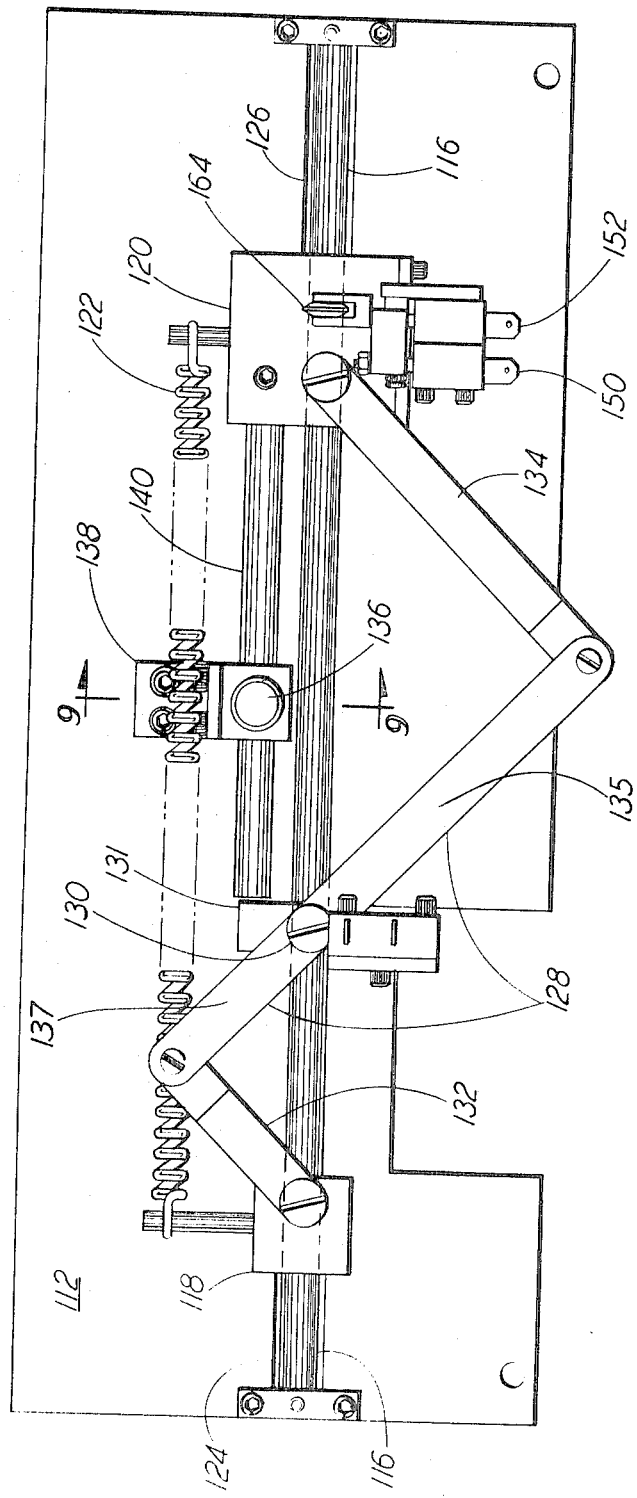
Figure 11:
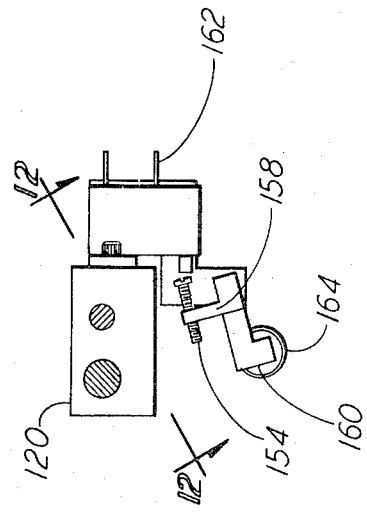
Figure 12:
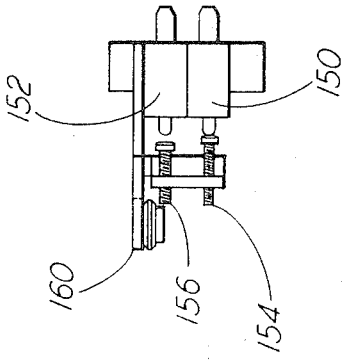
Figure 9:
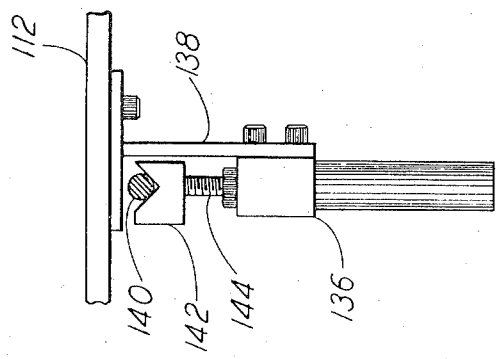
Figure 10:
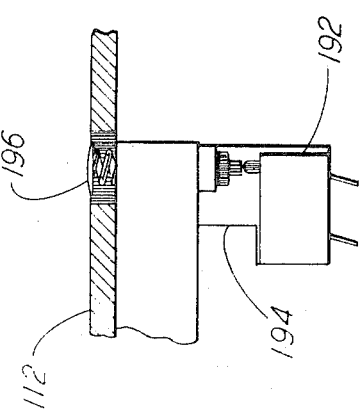
Figure 13:
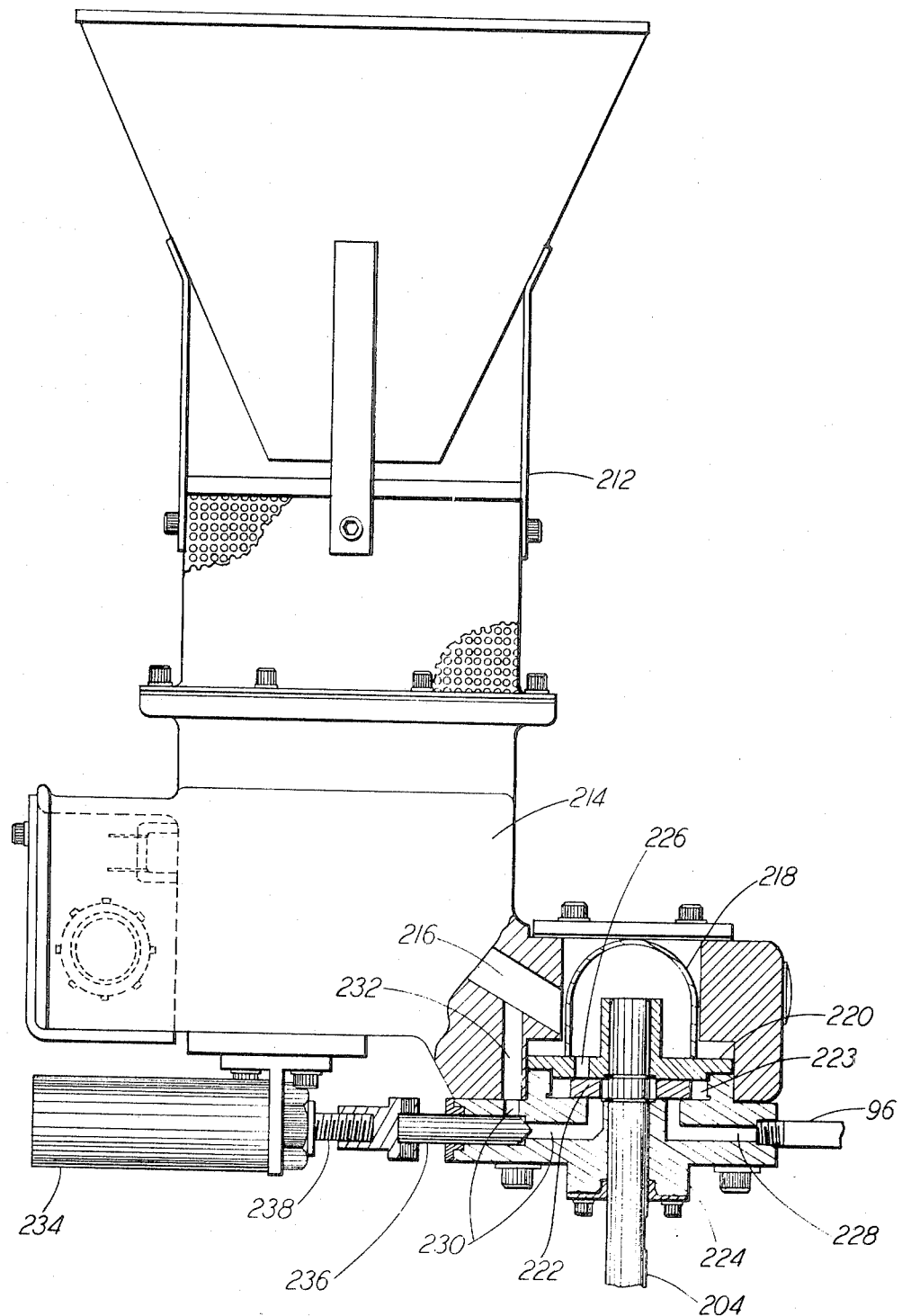
Figure 14:
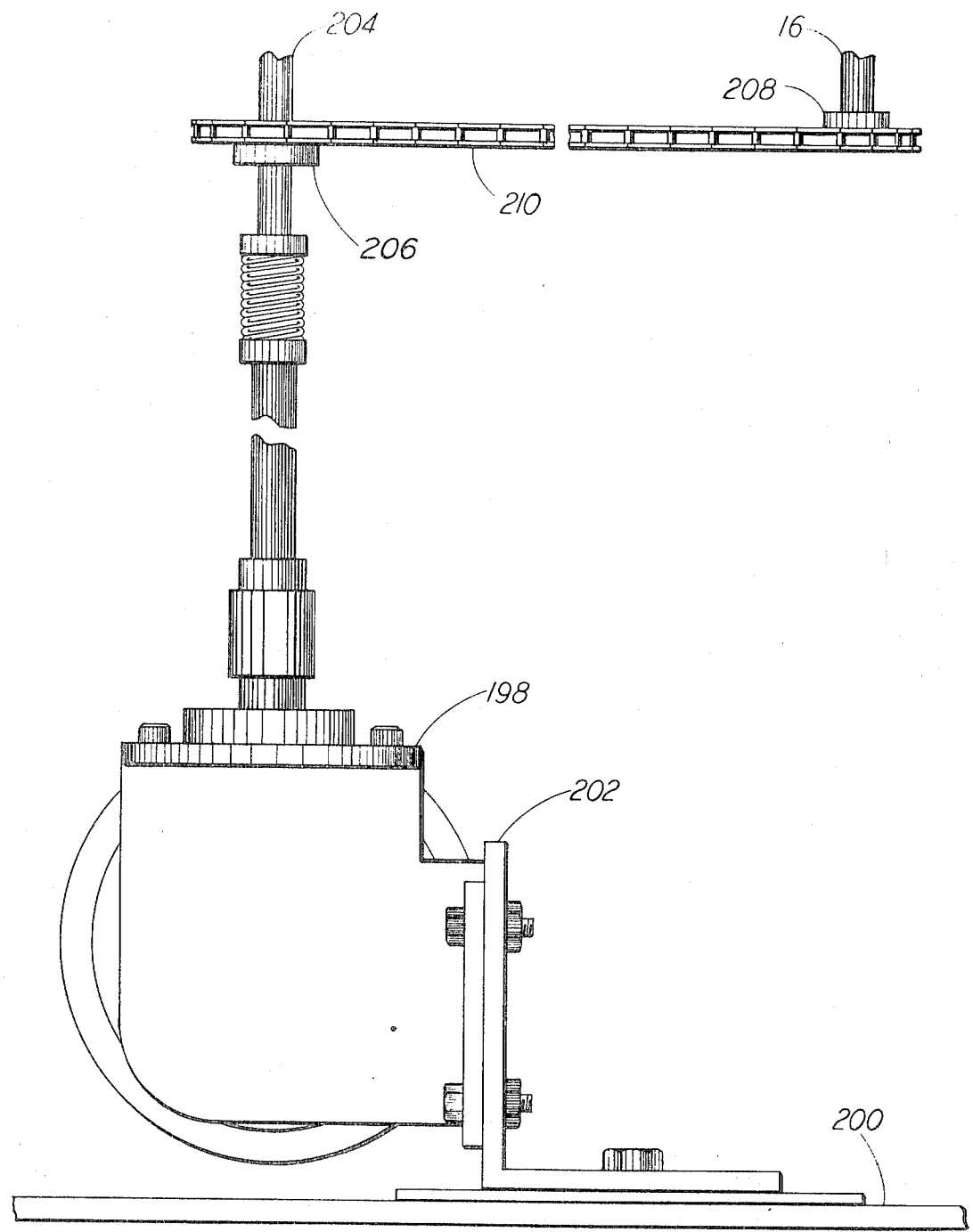
Figure 15:
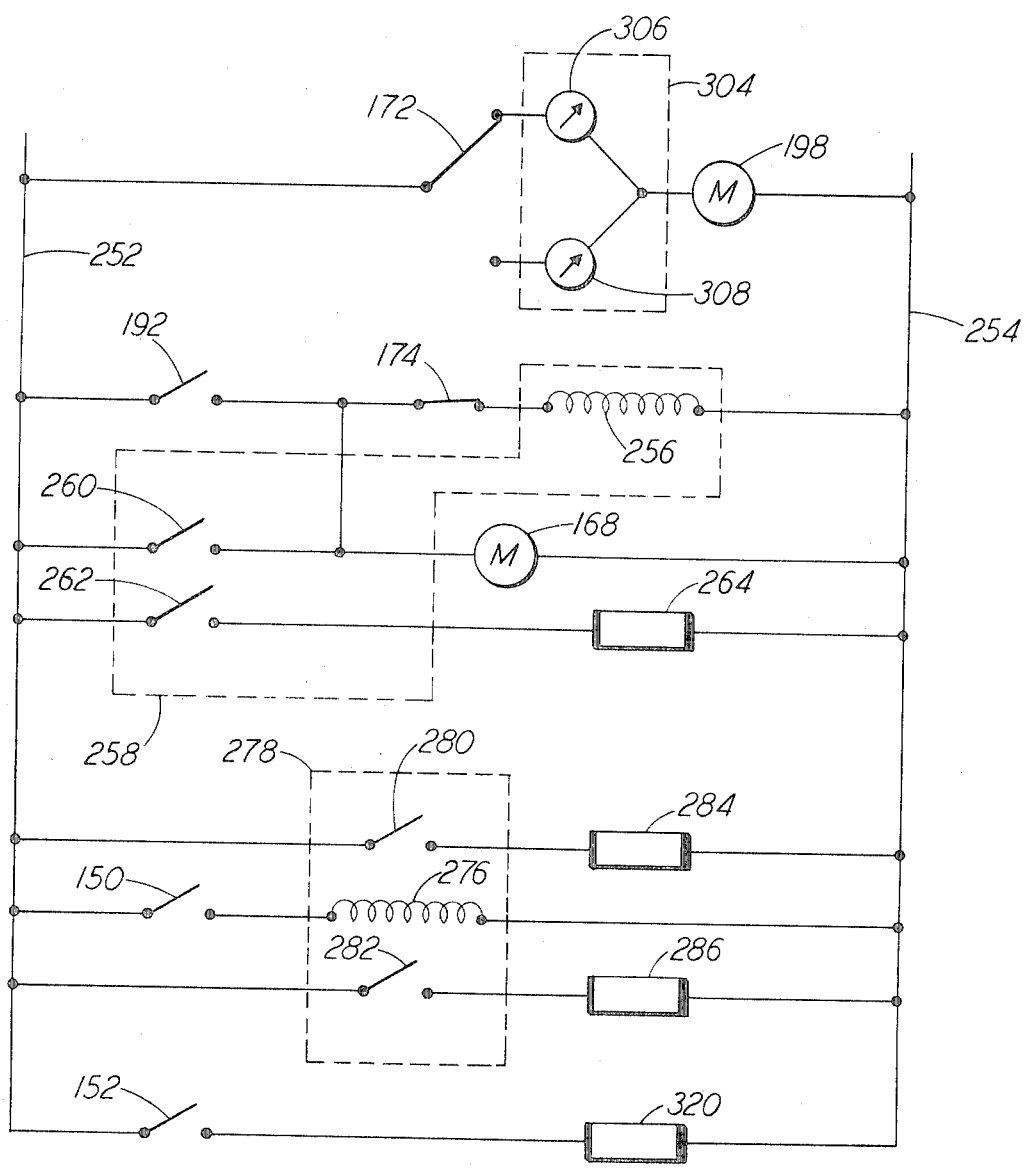
Figure 16:
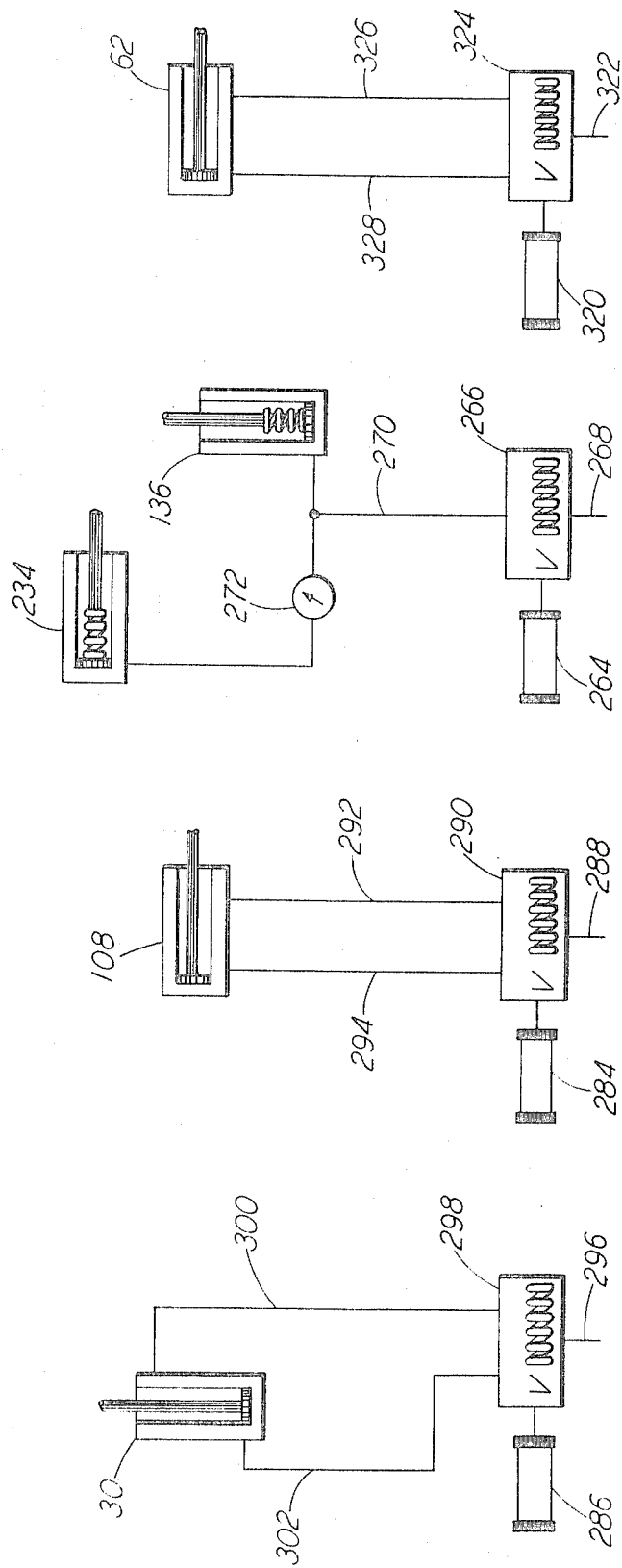

In the drawings:

FIG. 1 is a plan view of the machine;
FIG. 2 is a side elevation of a feed means;
FIG. 3 is a side elevation of a cement-extruding mechanism;
FIG. 4 is a plan view taken on the line 4—4 of FIG. 3;
FIG. 5 is a section taken on the line 5—5 of FIG. 4;
FIG. 6 is a front elevation of the control mechanisms;
FIG. 7 is a plan view taken on the line 7—7 of FIG. 6;
FIG. 8 is a bottom view of an arrangement for locating the work with respect to the work performing instrumentality;
FIG. 9 is a section taken on the line 9—9 of FIG. 8;
FIG. 10 is a section taken on the line 10—10 of FIG. 1;
FIG. 11 is a view taken on the line 11—11 of FIG. 6;
FIG. 12 is a view taken on the line 12—12 of FIG. 11;
FIG. 13 is an elevation of a pump for the cement-extruding mechanism;
FIG. 14 is a view of a drive for operating the feed means and the pump;
FIG. 15 is a schematic representation of an electrical control circuit for the machine;
FIG. 16 is a schematic representation of a pneumatic control circuit of the machine;
FIG. 17 is a view of a sole with a ribbon of cement applied thereto by the machine; and
FIG. 18 is a view of the sole being fed past a nozzle of the cement-extruding mechanism.

The operator is intended to stand to the right of the machine as seen in FIG. 1. Directions that extend toward the operator will be referred to as "forward" and directions that extend away from the operator will be referred to as "rearward." The part of the machine closest to the operator is considered to be the front of the machine and the part of the machine furthest from the operator is considered to be the back of the machine.

Referring to FIGS. 1 and 2, the machine comprises a base 10 having a pillar 12 extending upwardly therefrom. A shaft 16 extends vertically through the pillar 12. The shaft 16 is connected by gearing 18 to a shaft 20 that extends forwardly through and is rotatable in the pillar 12 and a column 22. The column 22 is secured to and extends upwardly of the base 10. A knurled feed roll 24 is secured to the front of the shaft 20.

A beam 26 is pivoted to the pillar 12 by pins 28 so as to extend forwardly of the pillar 12 and be vertically swingable about the axis of the pins 28. An air actuated motor 30, secured to the base 10, has an upwardly extending piston rod 32 that is pivotally connected to a lug 34. The lug 34 is secured to the beam 26. A block 36 is secured to the top of the front of the beam 26, and a shaft 38 is rotatably mounted in the block 36. The shaft 38 is connected by universal couplings 40 to a shaft 42 that is rotatably mounted in the pillar 12 below the shaft 20. The shaft 42 is connected to the shaft 20 by gearing 44. A feed roll 46 is secured to the front of the shaft 38 and is located below the feed roll 24. An idler roll 48, located forwardly of the feed roll 46, is rotatably mounted in an arm 50 that is attached to the block 36. A pair of idler guide rolls 52 and 54, rotatable about vertical axes, are also attached to the block 36.

Referring to FIGS. 1, 3 and 4, an angle 56 is secured to the base 10 laterally of the pillar 12. A framework 58 is secured to and extends upwardly of the angle 56. The framework 58 includes a block 60 in which an air actuated motor 62 is mounted and gibs 63 that mount a plate 64 for forward-rearward movement. A stem 66 extends downwardly of the plate 64 through a slot 68 in the framework 58. The stem 66 is connected to the piston rod 70 of the motor 62 so that the motor 62 may impart forward-rearward movement to the plate 64. A bolt 72 is threaded into the framework 58 and is in alignment with the front of the plate 64 so as to limit the extent of its forward movement, and a bolt 74 is in alignment with the back of the plate 64 so as to limit the extent of its rearward movement.

An arm 76 is pivoted by a pin 78 to an angle 80 that is secured to the plate 64. The arm 76 extends forwardly of the angle 80 and is swingable in a vertical plane about the axis of the pin 78. A tension spring 82, extending between the arm 76 and the framework 58 serves to yieldably urge the arm 76 downwardly. A bolt 84, threaded into the arm 76, is engageable with the plate 64 to limit the extent of downward movement of the arm 76 under the influence of the spring 82.

A nozzle 86 (FIG. 5) is secured to the front of the arm 76. The nozzle has an orifice 90 that intersects its bottom surface 88. The orifice 90 communicates through passages 92, 93 and 94 with a hose 96, and the hose 96 is connected to a pump that is described below. A valve 98, rotatably mounted in the nozzle 86, has a port 100 that, in one position of the valve, provides communication between the passages 92 and 93. Upon rotation of the valve 98, the port 100 is brought out of alignment with the passages 92 and 93 so as to prevent the flow of cement, as described below, through the orifice 90. A lever 102 is pinned to the valve 98 to effect its rotation. The lever 102 is pivoted to a clevis 104, and the clevis 104 is secured to the piston rod 106 of an air actuated motor 108 that is pivotally connected to the arm 76 by a pin 110.

Referring to FIGS. 1 and 8, a table 112 extends forwardly of the base 10 and below the feed roll 24. The table 112 has a cutout 114 to accommodate the rolls 46, 48, 52 and 54. A bar 116 extends lengthwise of and beneath the table 112. A pair of blocks 118 and 120 are slidably mounted on the bar 116 and are yieldably urged towards each other by a tension spring 122 that is secured to and extends between the blocks. Slots 124 and 126 in the table 112 respectively enable the blocks 118 and 120 to move towards each other under the influence of the spring 122 with the ends of the slots limiting the extent of such movement. A lever 128 is pivoted by a pin 130 to a bracket 131 that is secured to the bottom of the table 112. A link 132 extends between and is pivoted to a first end of the lever 128 and to the block 118. A link 134 extends between and is pivoted to the second end of the lever 128 and the block 120. The link 134 and the portion 135 of the lever 128 extending between the pin 130 and the link 134 are longer than the link 132 and the portion 137 of the lever 128 extending between the pin 130 and the link 132. A spring return air actuated motor 136 (see also FIG. 9) is secured to a bracket 138 that, in turn, is secured to the bottom of the table 112. A bar 140, secured to the block 120 for movement therewith, extends between a brake pad 142 that is secured to the piston rod 144 of the motor 136 and a flange of the bracket 138. A pair of gages 146 and 148 are respectively secured to the blocks 118 and 120 and extend above the table 112. A pair of electric switches 150 and 152 are secured to the block 120. Referring to FIGS. 11 and 12, the switches 150 and 152 are respectively actuable by screws 154 and 156 which are mounted to an arm 158. The arm 158 is mounted to a lever 160 that is pivoted to a housing 162 for the switches. A roll 164 is rotatably mounted to the lever 160.

Referring to FIGS. 6 and 7, a bracket 166 is secured to and extends forwardly of the base 10. A single speed electric motor 168, having a driven shaft 170, is mounted to the bracket 166 by hangers 171 (only one of which is shown in FIG. 6) with the shaft 170 extending upwardly of the motor 168. A pair of electric switches 172 and 174, having upwardly extending actuators 176 and 178, are secured to the bracket 166. A lower cam 180, a middle cam 182 and an upper cam 184 are clamped between a hub 186 that is secured to the motor shaft 170 and a bolt 188 that is threaded into this shaft. The cams are flat disks of substantially uniform radius that extend less that 360° about the axis of the shaft 170. The cam 182 has a downwardly depending lug 190 that is engageable with the actuator 178 of the switch 174.

Referring to FIGS. 1 and 10, an electric switch 192 is secured to the bottom of the table 112 by a bracket 194. The actuator 196 of the switch 192 extends into the cutout 114 and is resiliently urged upwardly of the table 112.

Referring to FIG. 14, a two speed electric motor 198 is secured to a part of the machine frame 200 by a bracket 202. The upwardly extending driven shaft 204 of the motor 198 is drivingly connected to the shaft 16 by sprockets 206 and 208 and a chain 210.

FIG. 13 shows a cement melting and pumping mechanism 212 that is incorporated in the machine. The mechanism includes a base 214 having a chamber (not shown) in which molten cement is collected as shown in pending application, Ser. No. 840,291 filed July 9, 1969. The molten cement gravitates from this chamber through a passage 216 to a chamber 218. The bottom of the chamber 218 is formed of a base 220 in which the shaft 204 of the motor 198 is rotatably mounted. A pump 222 is mounted to the shaft 204 in a cavity 223 that is located between the base 220 and a mount 224. A plurality of ports 226, only one of which is shown in FIG. 13, extends through the base 220 to provide communication between the chamber 218 and the cavity 223. A port 228 extends from the bottom of the cavity 223 to a side of the mount 224 where the port 228 is in communication with the end of the hose 96 that is remote from the nozzle 86. A port 230 in the mount 224 and a port 232 in the base 214 provide communication between the cavity 223 and the passage 216. A spring return air operated motor 234 is mounted to the base 214. A plunger 236, that is secured to the piston rod 238 of the motor 234, is slidable in a bore in the mount 224. When the plunger is in its rightward position, as shown in FIG. 13, it blocks the port 230. When the plunger is moved to the left by the motor 234, the port 230 is unblocked.

The pump 222 is a standard pump of the positive displacement type which will deliver predetermined quantities of fluid at rates that are proportional to the rotational speed of the shaft 204. It is manufactured by the W. H. Nichols Company of Waltham, Massachusetts.

In the idle condition of the machine: the piston rod 32 is retracted into the motor 30 so that the rolls 46 and 48 are in a lower position below the top of the table 112; the piston rod 70 is retracted into the motor 62 so that the plate 64 is bearing against the bolt 74 and the nozzle 86 is in a rearward position; the piston rod 106 is retracted into the motor 108 so that the valve 98 is closed with the port 100 out of alignment with the passages 92 and 93; the piston rod 144 is retracted into the motor 136 so that the brake 142 is not in engagement with the bar 140; the switches 150 and 152 are open; the motor 168 is turned off with the cams 180, 182 and 184 in the position shown in FIGS. 6 and 7; the switch actuator 176 of the switch 172 is in an upper position; the lug 190 is in engagement with the switch actuator 178 thus maintaining the switch 174 closed; the switch 192 is open; the motor 198 is rotating at a relatively high speed thereby causing the rolls 24 and 46 to rotate and cement to be pumped by the pump 222 downwardly from the chamber 218 through the ports 226 into the ports 228 and 230; and the piston rod 238 is retracted into the motor 234 so that the port 230 is unblocked and the cement forced into the port 230 by the pump is pumped back into the chamber 218 by way of the port 232 and the passage 216. Due to the fact that the valve 98 is closed at this time, after the hose 96 and the passages 93 and 94 have been filled with cement, the cement pumped by the pump 222 will follow the path of least resistance and pass back to the chamber 218 by way of the port 232 and the passage 216.

FIG. 17 shows a shoe sole 240 that is to be coated with cement by the machine. The cement is to be applied along the sole periphery from the breastline 242 on one side of the sole around the sole toe 244 and back to the breastline 246 on the other side of the sole in the form of a ribbon 248. The sole 240 is placed on the table 112 between the gages 146 and 148 and the gages are moved apart against the force of the spring 122 sufficiently so that the heel 250 of the sole bears against the gage 146, the toe 244 of the sole bears against the gage 148, the breastline 242 is bearing against the idler rolls 52, 54 and is located between the feed rolls 24, 46, and the nozzle orifice 90 is located above the sole breastline 242 a slight distance inward of its periphery. The relative lengths of the lever portion 135 and the link 134 on the one hand and the lever portion 137 and the link 132 on the other hand are so proportioned to the relative distances between a sole breastline and a sole toe on the one hand and a sole breastline and a sole heel on the other hand that, regardless of the length of the sole, when the sole is placed between the gages 146 and 148, as described above, the nozzle orifice 90 is located in the region of the breastline. The position the gage 148 assumes when it bears against the toe of the sole determines the distance between the roll 164 and the axis of the shaft 170.

The sole, which is now positioned above the switch 192, is now pressed down by the operator so as to temporarily depress the switch actuator 196 and thus temporarily close the switch 192.

A schematic representation of the electrical control circuit of the machine is shown in FIG. 15 wherein the lines 252 and 254 are connected to a source of electrical energy. From the figure, it can be seen that the closure of the switch 192 turns on the motor 168 and energizes the coil 256 of a relay 258 to thereby close switches 260 and 262 of this relay. The closure of the switch 260 establishes a holding circuit to the motor 168 so that the switch 192 may now open without turning off this motor. The closure of the switch 262 energizes a solenoid 264.

Referring to FIG. 16, which is a schematic representation of the pneumatic control circuit of the machine, the energization of the solenoid 264 acts to shift a valve 266 so that pressurized air may pass from a source through a line 268, the valve 266 and a line 270 to the motors 136 and 234 to actuate these motors. The air going to the motor 234 passes through a pressure regulator 272 so that it is set at less than full line pressure. The actuation of the motor 136 causes the bar 140 to be locked in position between the bracket 136 and the brake pad 142 to thereby lock the roll 164 as well as the gauges 146, 148 in position. The actuation of the motor 234 serves to block the port 230 so that the cement pumped by the pump 222 passes into the hose 96.

From the foregoing it can be seen that the closing of the switch 192 causes the motor 168 to rotate at a predetermined speed to thereby rotate the cams 180, 182 and 184 at a predetermined speed, causes the roller 164 and the gauges 146 and 148 to be locked in a position that is determined by the length of the sole 240 and causes cement to be pumped through the hose 96 toward the nozzle 86. While the nozzle valve 98 is closed at this time, it will shortly be opened in the manner described below and the buildup of the pressure of the cement in the hose 96 before the opening of the valve 98 is not sufficient to damage the hose. In any event, since the plunger 236 is moved rightwardly (FIG. 15) under the yieldable force of pressurized air, as set by the pressure regulator 272, any excessive buildup of pressure would force the plunger 236 leftwardly before the hose 96 could be damaged.

The rotation of the cams 180, 182 and 184, which is in a clockwise direction as seen in FIG. 7, causes the leading edge 274 of the cam 182 to engage the roll 164 and move the roll 164 up sufficiently to close the switch 150. The closure of the switch 150 energizes the coil 276 of a relay 278 to thereby close switches 280 and 282 of this relay. The closure of the switch 280 energizes a solenoid 284 and the closure of the switch 282 energizes a solenoid 286.

The motor 108 is maintained in its idle position by pressurized air passing from the source to this motor through a line 288, a valve 290 and a line 292. The energization of the solenoid 284 shifts the valve 290 and enables the pressurized air to pass to the motor 108 from the valve 290 through a line 294 and thus actuate this motor to project its piston rod 106 and thus open the valve 98 by bringing the port 100 into alignment with the passages 92 and 93.

The motor 30 is maintained in its idle position by pressurized air passing from the source to this motor through a line 296, a valve 298 and a line 300. The energization of the solenoid 286 shifts the valve 298 and enables pressurized air to pass to the motor 30 from the valve 298 through a line 302 and thus actuate this motor to project its piston rod and thus raise the rolls 46 and 48 into engagement with the sole 240.

From the foregoing, it can be seen that the closing of the switch 282 causes the sole 240 to be raised off the table 112 and be gripped and fed leftwardly, as seen in FIG. 18, by the rotating feed rolls 24, 46 while the ribbon of cement 248 is pumped through the nozzle orifice 90 onto the sole. Because of the acute angle formed between the feed rolls 24, 46 and the plane that is tangent to the guide rolls 52, 54, shown in FIG. 18, the sole is urged leftwardly and toward the guide rolls while the curved periphery of the sole is being guided leftwardly by the guide rolls. The distance between the cement ribbon 248 and the sole periphery is dependent on the distance between the nozzle orifice 90 and the plane that is tangent to the fronts (the bottoms in FIG. 18) of the guide rolls 52, 54. The idler roll 48 helps to support the sole while it is being fed by the rolls 24, 46. A cutout 302 (FIG. 5) is formed in the bottom of the nozzle 86 between the orifice 90 and the trailing end (the right end in FIG. 5) of the nozzle to enable the cement pumped through the orifice to be deposited on the sole as the sole is fed past the nozzle. The spring 82 causes the nozzle 86 to be resiliently urged against the sole during the feeding of the sole past the nozzle.

The switch 172 is a single pole double throw switch that is in electrical connection with a conventional speed control unit 304 for the motor 198. The unit 304 comprises a pair of potentiometers 306 and 308, each of which can be in circuit with the switch 172 depending on the position of the switch. The potentiometer 306 is so set as to rotate the motor 198 at a relatively high speed and the potentiometer 308 is so set as to rotate the motor 198 at a relatively low speed. In the idle condition of the machine and at the beginning of the sole feeding and cement applying operation, the switch 172 is connected to the potentiometer 306. Therefore, at the beginning of the sole feeding and cement applying operation the sole is being fed past the nozzle 86 at a relatively high speed and the cement is being pumped through the orifice 90 onto the sole at a relatively high rate.

While the sole feeding and cement applying operations are progressing, the leading edge 310 (FIG. 7) of the cam 180 engages the actuator 176 of the switch 172 to thereby move the switch 172 from connection with the potentiometer 306 and connects this switch to the potentiometer 308. This has the effect of causing the motor 198 to rotate at a relatively low speed thereby causing the sole to be fed past the nozzle 86 at a relatively low speed and cause the pump 222 to force cement onto the sole at a relatively low rate. When the trailing end 312 of the cam 180 passes the switch actuator 176, the switch 172 is again connected to the potentiometer 306 so that the sole is again fed at the original high speed and the cement is again pumped onto the sole at the original relatively high rate.

The motor 198 is operated at the relatively high speed so that the sole feeding and cement applying operation can take place is as short a time as possible. However, when the periphery of the toe 244 of the sole 240, which has a relatively small radius of curvature, is presented by the feed rolls 24, 46 to the guide rolls 52, 54 at the relatively high speed, the sole has a tendency to not swing quickly enough to enable the sole periphery to stay in continuous engagement with the guide rolls. It is therefore desirable to slow down the sole feeding movement during the movement of the toe end portion of the sole past the guide rolls 52, 54 and the nozzle 86. By having the rate that the cement is pumped onto the sole slow down a corresponding amount when the sole feeding movement is slowed down, a uniform distribution of cement is provided in the entire cement ribbon 248.

When the trailing edge 314 (FIG. 7) of the cam 182 passes the roll 176, the switch 150 is reopened, thereby deenergizing the relay coil 276 and causing the relay switches 280 and 282 to open. This causes the motor 30 to lower the rolls 46, 48 to their original position and causes the motor 108 to reclose the valve 98 thus terminating the sole feeding and cement-applying operation and enabling the operator to remove the sole from the machine. motor 168 continues to rotate until the lug 190 on the cam 182 engages the actuator 178 to open the switch 174 thereby deenergizing the relay coil 256 and causing the relay switches 260 and 262 to open. This causes the motor 168 to stop rotating, causes the motor 136 to operate so as to disengage the brake pad 142 from the bar 140 so that the spring 122 returns the gages 146, 148 to their original outer positions and causes the motor 234 to operate so as to unblock the port 230. This completes the machine cycle.

The speed of the motors 168 and 198 and the time interval between the engagement and disengagement of the roll 176 by the cam 182, which determine the length of the cement ribbon 248, are such that, at the end of the machine cycle, the cement ribbon 248 extends from the breastline region 242 on one side of the sole to the breastline region 246 on the other side of the sole.

Since the position of the roll 164 is determined by the position of engagement of the gauge 148 with the toe 244 of the insole 240, the longer the sole the further the distance between the roll 176 and the axis of rotation of the cam 182. From FIG. 7 it can be seen that the cam edges 274 and 314 are concave so that, starting from the radially outermost ends of the cam edges 274 and 314, the closer a point on the cam edge is to the axis of rotation of the cam 182, the further that point is from a radial line that extends from the axis of rotation to the radially outermost ends of the cam edges until a point of maximum distance between the cam edge and the radial line is reached. The soles to be used have a range of lengths such that, with the shortest sole, the roll 164 will be in alignment with the points of maximum distance of the cam edges and, with the longest sole, the roll 164 will be in alignment with the radially outermost ends of the cam edges. Therefore, the longer the time that the roll 176 is engaged by the cam 182, the longer the time that the sole is fed and the cement is applied 248 the roll. The contours of the cam edges 274 and 314 are so fashioned that the ribbon of cement 248 will extend along the periphery of the sole 240 from the region of one breastline 242, around the toe 244 to the region of the other breastline 246 regardless of the length of the sole.

The rolls 164 and 176, in the idle position of the machine, are located between the leading and trailing edges 274 and 314 of the cam 182 and are also located between the leading and trailing edges 310 and 312 of the cam 180. The angle defined by the leading and trailing edges 310 and 312 extending clockwise (FIG. 7) from the edge 310 to the edge 312 is greater than the corresponding angle defined by the leading and trailing edges 274 and 314 of the cam 182. Therefore, the time interval between the closing of the switch 150 by the cam edge 274 and the shifting of the switch 172 by the cam edge 310 is proportional to the distance between the switch 150 and the nozzle orifice 90. Similarly, the time interval between the shifting of the switch 172 by the cam edge 312 and the opening of the switch 150 by the cam edge 314 is proportional to the distance between the switch 150 and the nozzle orifice 90. Therefore, regardless of the length of the sole, substantially the same portion of the toe end of the sole is fed past the nozzle orifice at the relatively low speed while the cement is extruded at the relatively low rate.

In some types of shoes, it is desirable to have the portions of the ribbon 248 that extend between the regions of the balls 316 and 318 (FIG. 17) of the sole and the toe end 244 of the sole to be spaced further from the sole periphery than the portions of the ribbon 248 that extend between the ball regions and the regions of the breastlines 242 and 246. When this is desired, the cam 184 is utilized as set forth below.

During the rotation of the cams 180, 182 and 184 and while the switch 150 is closed by the cam 182, the leading edge 320 of the cam 184 engages the roll 164 to move the lever 160 further upward and cause the screw 156 to close the switch 152 while the switch 150 remains closed. The closure of the switch 152 energizes a solenoid 320.

The motor 62 is maintained in its idle position with the nozzle orifice 90 relatively close to the sole periphery by pressurized air passing from the source through a line 322, a valve 324 and a line 326 to this motor. The energization of the solenoid 320 shifts the valve 324 so that the pressurized air passes to the motor 62 from the valve 324 through a line 328 to actuate the motor 62 to move the nozzle orifice forwardly and further from the sole periphery to a position determined by the engagement of the plate 64 with the bolt 72. When the trailing edge 330 of the cam 184 passes the roll 172, the switch 152 opens to deenergize the solenoid 320 so that the valve 324 is shifted back to its original position and the motor 62 causes the nozzle orifice 90 to be moved rearwardly to its original position. The switch 150 is unaffected by the opening of the switch 152 and remains closed until it opens as a result of the movement of the trailing edge 314 of the cam 182 past the roll 164.

The edges 320 and 330 of the cam 184 are concave and are fashioned similarly to the edges 272 and 314 of the cam 182. The angle defined by the leading and trailing edges 320 and 330 extending clockwise (FIG. 7) from the edge 320 to the edge 330 is greater than the corresponding angle defined by the leading and trailing edges 274 and 314 of the cam 182, and, in the idle position of the machine, the roll 164 is located between the leading and trailing edges of both of these cams. Therefore, the time intervals between the movements of the leading edge 274 and trailing edge 314 of the cam 182, of the leading edges 274 and 320 of the cams 182 and 184, and of the leading edge 320 and trailing edge 330 of the cam 184 past the roll 164 is proportional to the distance between the roll 164 and the nozzle orifice 90. As a result, the longer the sole, the longer the time period in which the nozzle orifice 90 is positioned relatively far from the sole periphery, so that, regardless of the length of the sole, the portion of the cement ribbon 248 extending between the ball regions 316 and 318 will be positioned further from the sole periphery than the remainder of the cement ribbon.

Heating means are incorporated in the cement melting and pumping mechanism 212, the hose 96 and the nozzle 86 so that the thermoplastic cement is deposited on the sole 240 in fluent condition. Before the cement ribbon 248 has had time to solidify, the sole is aligned with the bottom of a lasted shoe and is pressed and secured to the bottom of the shoe in a conventional sole press.

We claim:

1. A machine for performing work along a selected portion of the periphery of a workpiece comprising: a work performing instrumentality; feed means operable to feed the workpiece periphery past the instrumentality at a prescribed speed; a gage, mounted for movement towards and away from the instrumentality, adapted to coact with a workpiece end and so position the workpiece that the beginning of said portion is at said instrumentality; an operating mechanism operative, when actuated, to cause the feed means to commence the workpiece feeding and operative, when deactuated, to terminate the workpiece feeding; means mounting the operating mechanism for movement with the gage; and a control mechanism so constructed as to actuate the operating mechanism whereby the work may be performed as the workpiece periphery is fed past the instrumentality and to deactuate the operating mechanism subsequent to its actuation and after the lapse of a time interval that is proportional to the distance between the operating mechanism and the instrumentality.

2. A machine as defined in claim 1 wherein said instrumentality comprises: a nozzle so located as to apply a ribbon of cement along said portion during the workpiece feeding; and extruding means operable to extrude cement through the nozzle; and further comprising: means so constructing the control mechanism as to operate the extruding means concomitantly with the commencement of the workpiece feeding and to terminate the operation of the extruding means concomitantly with the termination of the workpiece feeding.

3. A machine as defined in claim 1 further comprising: a second gage mounted for movement toward and away from the first gage and located on the opposite side of the instrumentality from the first gage; and a means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

4. A machine as defined in claim 3 wherein said instrumentality comprises: a nozzle so located as to apply a ribbon of cement along said portion during the workpiece feeding; and extruding means operable to extrude cement through the nozzle; and further comprising: means so constructing the control mechanism as to operate the extruding means concomitantly with the commencement of the workpiece feeding and to terminate the operation of the extruding means concomitantly with the termination of the workpiece feeding.

5. A machine as defined in claim 1 wherein said control mechanism comprises: a cam having a leading edge and a trailing edge located so as to be in intersecting relationship with the operating mechanism; means for moving the cam past the operating mechanism at a prescribed speed; means responsive to the movement of the leading edge past the operating mechanism to actuate the operating mechanism; means responsive to the movement of the trailing edge past the operating mechanism to deactuate the operating mechanism; and means so constructing the leading and trailing edges that the time lapse between the movements of said leading and trailing edges past the operating mechanism is proportional to the distance between the operating mechanism and the instrumentality.

6. A machine as defined in claim 5 wherein said instrumentality comprises: a nozzle so located as to apply a ribbon of cement along said portion during the workpiece feeding; and extruding means operable to extrude cement through the nozzle; and further comprising: means responsive to the movement of said leading edge past the operating mechanism to operate the extruding means; and means responsive to the movement of said trailing edge past the operating mechanism to terminate the operation of the extruding means.

7. A machine as defined in claim 5 further comprising: a second gage mounted for movement toward and away from the first gage and located on the opposite side of the instrumentality from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

8. A machine as defined in claim 7 wherein said instrumentality comprises: a nozzle so located as to apply a ribbon of cement along said portion during the workpiece feeding; and extruding means operable to extrude cement through the nozzle; and further comprising: means responsive to the movement of said leading edge past the operating mechanism to operate the extruding means; and means responsive to the movement of said trailing edge past the operating mechanism to terminate the operation of the extruding means.

9. A machine for performing work along a selected portion of the periphery of a workpiece comprising: a work performing instrumentality; an upper feed roll; a lower feed roll mounted for movement towards and away from the upper feed roll; a guide means located alongside the feed rolls; means for rotating the feed rolls at a prescribed speed whereby, when the lower feed roll is in an upper position, the feed rolls and guide means coact to feed the workpiece periphery past the instrumentality at a prescribed speed; means for initially maintaining the lower feed roll in a lower position; a table located at such a level as to support the workpiece between the feed rolls; a gage, mounted on the table for movement towards and away from the instrumentality, adapted to coact with a workpiece end and so position the workpiece that the beginning of said portion is at said instrumentality; an operating mechanism operative, when actuated, to raise the lower feed roll and thereby raise the workpiece from the table and cause the feed rolls to feed the workpiece periphery past the instrumentality at said prescribed speed and operative when deactuated to lower the lower feed roll to terminate the workpiece feeding; means mounting the operating mechanism for movement with the gage; a brake actuable to lock the gage against movement on the table; means initially maintaining the brake in unactuated condition; a cam, mounted for rotation, having a leading edge and a trailing edge located so as to be in intersecting relation with the operating mechanism; means for initially maintaining the cam in a position wherein the operating mechanism is between said leading and trailing edges; drive means actuable to rotate the cam through one revolution at a prescribed speed; means, responsive to the actuation of the drive means, to actuate the brake to lock the gage and the operating mechanism against movement; means responsive to the movement of said leading edge past the operating mechanism to actuate the operating mechanism; means responsive to the movement of said trailing edge past the operating mechanism to deactuate the operating mechanism; and means so constructing the leading and trailing edges that the time lapse between the movements of said leading and trailing edges past the operating mechanism is proportional to the distance between the operating mechanism and the instrumentality.

10. A machine as defined in claim 9 wherein said instrumentality comprises: a nozzle so located as to apply a ribbon of cement along said portion during the workpiece feeding; and extruding means operable to extrude cement through the nozzle; and further comprising: means responsive to the movement of said leading edge past the operating mechanism to operate the extruding means; and means responsive to the movement of said trailing edge past the operating mechanism to terminate the operation of the extruding means.

11. A machine as defined in claim 9 further comprising: a second cage mounted for movement toward and away from the first gage and located on the opposite side of the instrumentally from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

12. A machine as defined in claim 11 wherein said instrumentality comprises: a nozzle so located as to apply a ribbon of cement along said portion during the workpiece feeding; and extruding means operable to extrude cement through the nozzle; and further comprising: means responsive to the movement of said leading edge past the operating mechanism to operate the extruding means; and means responsive to the movement of said trailing edge past the operating mechanism to terminate the operation of the extruding means.

13. A machine for performing work along a selected portion of the periphery of a workpiece comprising: a work performing instrumentality; feed means operable to impart relative feeding movement of the workpiece periphery with respect to the instrumentality at a prescribed speed; guide means operative to bear against the workpiece periphery during said feeding movement and guide the workpiece past the instrumentality; means mounting the instrumentality for movement in a forward-rearward path so that it may be located different distances forwardly of the guide means and inwardly of the workpiece periphery; means for initially locating the instrumentality at a predetermined position forwardly of the guide means and inwardly of the workpiece periphery; a first operating mechanism operative, when actuated, to cause the feed means to commence said feeding movement and operative, when deactuated, to terminate said feeding movement; a second operating mechanism operative, when actuated, to move the instrumentality in said path to a different position forwardly of the guide means and inwardly of the workpiece periphery; a first control mechanism so constructed as to deactuate the first operating mechanism subsequent to its actuation and after the lapse of a time interval that is proportional to the length of the workpiece; and a second control mechanism so constructed as to actuate the second operating mechanism between the actuation and deactuation of the first actuating mechanism and after the lapse of a time interval subsequent to the actuation of the first operating mechanism that is proportional to the length of the workpiece.

14. A machine as defined in claim 13 wherein said instrumentality comprises: a nozzle for applying a ribbon of cement along said portion during said relative feeding movement; and extruding means operable to extrude cement through the nozzle; and further comprising: means for causing the extruding means to commence the cement extrusion concomitantly with the commencement of said feeding movement; and means so constructing the first control mechanism as to cause the termination of the cement extrusion concomitantly with the deactuation of the first operating mechanism.

15. A machine for performing work along a selected portion of the periphery of a workpiece comprising: a work performing instrumentality; feed means operable to feed the workpiece periphery past the instrumentality at a prescribed speed; guide means operative to bear against the workpiece periphery during the workpiece feed and guide the workpiece periphery past the instrumentality; means mounting the instrumentality for movement in a forward-rearward path so that it may be located different distances forwardly of the guide means and inwardly of the workpiece periphery; means for initially locating the instrumentality at a first position forwardly of the guide means and inwardly of the workpiece periphery; a gage, mounted for movement towards and away from the instrumentality, adapted to coact with a workpiece end and so position the workpiece that the beginning of said portion is at said instrumentality; a first operating mechanism operative, when actuated, to cause the feed means to commence the workpiece feeding and operative, when deactuated, to terminate the workpiece feeding; a second operating mechanism operative, when actuated, to move the instrumentality in said path to a second position forwardly of the guide means and inwardly of the workpiece periphery and operative, when deactuated, to move the instrumentality in said path back to the first position; means mounting the first and second operating mechanisms for movement with the gage; a first control mechanism so constructed as to actuate the first operating mechanism whereby the work may be performed as the workpiece periphery is fed past the instrumentality and to deactuate the first operating mechanism subsequent to its actuation and after the lapse of a time interval that is proportional to the distance between the first operating mechanism and the instrumentality; and a second control mechanism so constructed as to actuate the second operating mechanism between the actuation and deactuation of the first operating mechanism and after the lapse of a time interval subsequent to the actuation of the first operating mechanism that is proportional to the distance between the second operating mechanism and the instrumentality and to deactuate the second operating mechanism between the actuation of the second operating mechanism and the deactuation of the first operating mechanism after the lapse of a time interval subsequent to the actuation of the second operating mechanism that is proportional to the distance between the second operating mechanism and the instrumentality.

16. A machine as defined in claim 15 wherein said instrumentality comprises: a nozzle so located as to apply a ribbon of cement along said portion during the workpiece feeding; and extruding means operable to extrude cement through the nozzle; and further comprising: means so constructing the first control mechanism as to operate the extruding means concomitantly with the commencement of the workpiece feeding and to terminate the operation of the extruding means concomitantly with the termination of the workpiece feeding.

17. A machine as defined in claim 15 further comprising: a second gage mounted for movement toward and away from the first gage and located on the opposite side of the instrumentality from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

18. A machine as defined in claim 17 wherein said instrumentality comprises: a nozzle so located as to apply a ribbon of cement along said portion during the workpiece feeding; and extruding means operable to extrude cement through the nozzle; and further comprising: means so constructing the first control mechanism as to operate the extruding means concomitantly with the commencement of the workpiece feeding and to terminate the operation of the extruding means concomitantly with the termination of the workpiece feeding.

19. A machine as defined in claim 15 wherein said control mechanisms comprise: an actuator mounted to said first and second operating mechanisms; a first cam having a first leading edge and a first trailing edge located so as to be in intersecting relationship with the actuator; a second cam having a second leading edge and a second trailing edge located so as to be in intersecting relationship with the actuator; means for moving the first cam past the actuator and the second cam past the actuator at a prescribed speed; means responsive to the movement of the first leading edge past the actuator to actuate the first operating mechanism; means responsive to the movement of the first trailing edge past the actuator to deactuate the first operating mechanism; means responsive to the movement of the second leading edge past the actuator to actuate the second operating mechanism; means responsive to the movement of the second trailing edge past the actuator to deactuate the second operating mechanism; and means so constructing the cams and the leading and trailing edges that the time lapse between the movements of the first leading edge and the first trailing edge past the actuator is proportional to the distance between the actuator and the instrumentality, the second leading edge moves past the actuator between the movements of the first leading and trailing edges past the actuator and after the lapse of a time interval subsequent to the movement of the first leading edge past the actuator that is proportional to the distance between the actuator and the instrumentality, and the second trailing edge moves past the actuator between the movement of the second leading edge past the actuator and the movement of the first trailing edge past the actuator and after the lapse of a time interval subsequent to the movement of the second leading edge past the actuator that is proportional to the distance between the actuator and the instrumentality.

20. A machine as defined in claim 19 wherein said instrumentality comprises: a nozzle so located as to apply a ribbon of cement along said portion during the workpiece feeding; and extruding means operable to extrude cement through the nozzle; and further comprising: means responsive to the movement of said first leading edge past actuator to operate the extruding means; and means responsive to the movement of said first trailing edge past the actuator to terminate the operation of the extruding means.

21. A machine as defined in claim 19 further comprising: a second gage mounted for movement toward and away from the first gage and located on the opposite side of the instrumentality from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

22. A machine as defined in claim 21 wherein said instrumentality comprises: a nozzle so located as to apply a ribbon of cement along said portion during the workpiece feeding; and extruding means operable to extrude cement through the nozzle; and further comprising: means responsive to the movement of said first leading edge past the actuator to operate the extruding means; and means responsive to the movement of said first trailing edge past the actuator to terminate the operation of the extruding means.

23. A machine for performing work along a selected portion of the periphery of a workpiece comprising: a work performing instrumentality; an upper feed roll; a lower feed roll mounted for movement towards and away from the upper feed roll; guide means located alongside the feed rolls; means for rotating the feed rolls at a prescribed speed whereby, when the lower feed roll is in an upper position, the feed rolls and guide means coact to feed the workpiece periphery past the instrumentality at a prescribed speed with the guide means bearing against the workpiece periphery and guiding the workpiece periphery past the instrumentality; means for initially maintaining the lower feed roll in a lower position; means mounting the instrumentality for movement in a forward-rearward path so that it may be located different distances forwardly of the guide means and inwardly of the workpiece periphery; means for initially locating the instrumentality at a first position forwardly of the guide means and inwardly of the workpiece periphery; a table located at such a level as to support the workpiece between the feed rolls; a gage, mounted on the table for movement towards and away from the instrumentality, adapted to coact with a workpiece end and so position the workpiece that the beginning of said portion is at said instrumentality; a brake actuable to lock the gage against movement on the table; means initially maintaining the brake in unactuated condition; a first operating mechanism operative, when actuated, to raise the lower feed roll and thereby raise the workpiece from the table and cause the feed rolls to feed the workpiece periphery past the instrumentality and operative when deactuated to lower the lower feed roll to terminate the workpiece feeding; a second operating mechanism operative, when actuated, to move the instrumentality in said path to a second position forwardly of the guide means and inwardly of the workpiece periphery and operative, when deactuated, to move the instrumentality in said path back to the first position; means mounting the first and second operating mechanisms for movement with the gage; an actuator mounted to said first and second operating mechanisms; a first cam and a second cam mounted for rotation in unison about a common axis; a first leading edge and a first trailing edge on the first cam located so as to be in intersecting relation with the actuator and defining a first angle; a second leading edge and a second trailing edge on the second cam located so as to be in intersecting relation with the actuator and defining a second angle that is greater than the first angle and is such that the first angle lies within the second angle; means for initially maintaining the cams in a position wherein the actuator is between said leading and trailing edges; drive means actuable to rotate the cams through one revolution at a prescribed speed; means, responsive to the actuation of the drive means, to actuate the brake to lock the gage and the actuator against movement; means responsive to the movement of the first leading edge past the actuator to actuate the first operating mechanism; means responsive to the movement of the second leading edge past the actuator to actuate the second operating mechanism; means responsive to the movement of the second trailing edge past the actuator to deactuate the second operating mechanism; means responsive to the movement of the first trailing edge past the actuator to deactuate the first operating mechanism; and means so constructing the leading and trailing edges that the time lapse between the movements of the first leading edge and the first trailing edge past the actuator is proportional to the distance between the actuator and the instrumentality, the second leading edge moves past the actuator between the movements of the first leading and trailing edges past the actuator and after the lapse of a time interval subsequent to the movement of the first leading edge past the actuator that is proportional to the distance between the actuator and the instrumentality, and the second trailing edge moves past the actuator between the movement of the second leading edge past the actuator and the movement of the first trailing edge past the actuator and after the lapse of a time interval subsequent to the movement of the second leading edge past the actuator that is proportional to the distance between the actuator and the instrumentality.

24. A machine as defined in claim 23 wherein said instrumentality comprises: a nozzle so located as to apply a ribbon of cement along said portion during the workpiece feeding; and extruding means operable to extrude cement through the nozzle; and further comprising: means responsive to the movement of said first leading edge past the first actuator to operate the extruding means, and means responsive to the movement of said first trailing edge past first actuator to terminate the operation of the extruding means.

25. A machine as defined in claim 23 further comprising: a second gage mounted for movement toward and away from the first gage and located on the opposite side of the instrumentality from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

26. A machine as defined in claim 25 wherein said instrumentality comprises: a nozzle so located as to apply a ribbon of cement along said portion during the workpiece feeding; and extruding means operable to extrude cement through the nozzle; and further comprising: means responsive to the movement of said first leading edge past the actuator to operate the extruding means; and means responsive to the movement of said first trailing edge past the actuator to terminate the operation of the extruding means.

27. A machine for performing work along a selected portion of the periphery of a workpiece comprising: a work performing instrumentality; feed means operable to impart relative movement of the workpiece periphery with respect to the instrumentality at a relatively high speed and a relatively low speed; a first operating mechanism operative, when actuated, to cause the feed means to commence said feeding movement and operative, when deactuated, to terminate said feeding movement; a second operating mechanism operative, when actuated, to operate the feed means at one of said speeds and operative, when deactuated, to operate the feed means at the other of said speeds; a first control mechanism so constructed as to deactuate the first operating mechanism subsequent to its actuation and after the lapse of a time interval that is proportional to the length of the workpiece; and a second control mechanism so constructed as to actuate the second operating mechanism between the actuation and deactuation of the first operating mechanism and after the lapse of a time interval subsequent to the actuation of the first operating mechanism that is proportional to the length of the workpiece.

28. A machine is defined in claim 27 wherein said instrumentality comprises: a nozzle for applying a ribbon of cement along said portion during said feeding movement; extruding means operable to extrude cement through the nozzle; an extruding means drive operable to effect the extrusion at a relatively high rate or at a relatively low rate; and further comprising: means for causing the extruding means drive to commence the cement extrusion concomitantly with the commencement of said feeding movement; means so constructing the first control mechanism as to cause the extruding means drive to terminate the cement extrusion concomitantly with the deactuation of the first operating mechanism; and means so connecting the second operating mechanism and the extruding means drive that when the feed means is operating at the relatively high speed the extruding means drive is effecting the extrusion at the relatively high rate and when the feed means is operating at the relatively low speed the extruding means drive is effecting the extrusion at the relatively low rate.

29. A machine for performing work along a selected portion of the periphery of a workpiece comprising: a work performing instrumentality; feed means operable to feed the workpiece periphery past the instrumentality at a relatively high speed and a relatively low speed; a gage, mounted for movement towards and away from the instrumentality, adapted to coact with a workpiece end and so position the workpiece that the beginning of said portion is at said instrumentality; a first operating mechanism operative, when actuated, to cause the feed means to commence the workpiece feeding and operative, when deactuated, to terminate the workpiece feeding; a second operating mechanism operative, when actuated, to operate the feed means at one of said speeds and operative, when deactuated, to operate the feed means at the other of said speeds; means mounting the first operating mechanism for movement with the gage; a first control mechanism so constructed as to actuate the first operating mechanism whereby the work may be performed as the workpiece periphery is fed past the instrumentality and to deactuate the first operating mechanism subsequent to its actuation and after the lapse of a time interval that is proportional to the distance between the first operating mechanism and the instrumentality; and a second control mechanism so constructed as to actuate the second operating mechanism between the actuation and deactuation of the first operating mechanism and after the lapse of a time interval subsequent to the actuation of the first operating mechanism that is proportional to the distance between the first operating mechanism and the instrumentality and to deactuate the second operating mechanism between the actuation of the second operating mechanism and the deactuation of the first operating mechanism at a time interval before the deactuation of the first operating mechanism that is proportional to the distance between the first operating mechanism and the instrumentality.

30. A machine as defined in claim 29 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means so constructing the first control mechanism as to operate the extruding means drive concomitantly with the commencement of the workpiece feeding and to terminate the operation of the extruding means drive concomitantly with the termination of the workpiece feeding; and means so connecting the second operating mechanism and the extruding means drive that when the feed means is operating at the relatively high speed the extruding means drive is effecting the extrusion at the relatively high rate and when the feed means is operating at the relatively low speed the extruding means drive is affecting the extrusion at the relatively low rate.

31. A machine as defined in claim 29 further comprising: a second gage mounted for movement toward and away from the first gage and located on the opposite side of the instrumentality from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

32. A machine as defined in claim 31 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means so constructing the first control mechanism as to operate the extruding means drive concomitantly with the commencement of the workpiece feeding and to terminate the operation of the extruding means drive concomitantly with the termination of the workpiece feeding; and means so connecting the second operating mechanism and the extruding means drive that when the feed means is operating at the relatively high speed the extruding means drive is effecting the extrusion at the relatively high rate and when the feed means is operating at the relatively low speed the extruding means drive is effecting the extrusion at the relatively low rate.

33. A machine as defined in claim 29 wherein said control mechanisms comprise: a first actuator mounted to said first operating mechanism; a first cam having a first leading edge and a first trailing edge located so as to be in intersecting relationship with the first actuator; a second actuator mounted to said second operating mechanism; a second cam having a second leading edge and a second trailing edge located so as to be in intersecting relationship with the second actuator; means for moving the first cam past the first actuator and the second cam past the second actuator; means responsive to the movement of the first leading edge past the first actuator to actuate the first operating mechanism; means responsive to the movement of the first trailing edge past the first actuator to deactuate the first operating mechanism; means responsive to the movement of the second leading edge past the second actuator to actuate the second operating mechanism; means responsive to the movement of the second trailing edge past the second actuator to deactuate the second operating mechanism; and means so constructing the cams and the leading and trailing edges that the time lapse between the movements of the first leading edge and the first trailing edge past the first actuator is proportional to the distance between the first actuator and the instrumentality, the second leading edge moves past the second actuator between the movements of the first leading and trailing edges past the first actuator and after the lapse of a time interval subsequent to the movement of the first leading edge past the first actuator that is proportional to the distance between the first actuator and the instrumentality, and the second trailing edge moves past the second actuator between the movement of the second leading edge past the second actuator and the movement of the first trailing edge past the first actuator and at a time interval before the movement of the first trailing edge past the first actuator that is proportional to the distance between the first actuator and the instrumentality.

34. A machine as defined in claim 33 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means responsive to the movement of the first leading edge past the first actuator to operate the extruding means drive; means responsive to the movement of the first trailing edge past the first actuator to terminate the operation of the extruding means drive; means responsive to the movement of the second leading edge past the second actuator to cause the extruding means drive to extrude cement at the relative rate that corresponds to the relative speed that the feed means is operated at in response to the actuation of the second operating mechanism; and means responsive to the movement of the second trailing edge past the second actuator to cause the extruding means drive to extrude cement at the relative rate that corresponds to the relative speed that the feed means is operated at in response to the deactuation of the second operating mechanism.

35. A machine as defined in claim 32 further comprising: a second gage mounted for movement toward and away from the first gage and located on the opposite side of the instrumentality from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

36. A machine as defined in claim 35 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means responsive to the movement of the first leading edge past the first actuator to operate the extruding means drive; means responsive to the movement of the first trailing edge past the first actuator to terminate the operation of the extruding means drive; means responsive to the movement of the second leading edge past the second actuator to cause the extruding means drive to extrude cement at the relative rate that corresponds to the relative speed that the feed means is operated at in response to the actuation of the second operating mechanism; and means responsive to the movement of the second trailing edge past the second actuator to cause the extruding means drive to extrude cement at the relative rate that corresponds to the relative speed that the feed means is operated at in response to the deactuation of the second operating mechanism.

37. A mechanism for performing work along a selected portion of the periphery of a workpiece comprising: a work performing instrumentality; an upper feed roll; a lower feed roll mounted for movement towards and away from the upper feed roll; guide means located alongside the feed rolls; feed means operable to rotate the feed rolls at a relatively high speed and a relatively low speed whereby, when the lower feed roll is in an upper position, the feed rolls and the guide means coact to feed the workpiece periphery past the instrumentality at the relatively high speed or the relatively low speed; means for initially maintaining the lower feed roll in a lower position; a table located at such a level as to support the workpiece between the feed rolls; a gage, mounted on the table for movement towards and away from the instrumentality, adapted to coact with a workpiece end and so position the workpiece that the beginning of said portion is at said instrumentality; a brake actuable to lock the gage against movement on the table; means initially maintaining the brake in unactuated condition; a first operating mechanism operative, when actuated, to raise the lower feed roll and thereby raise the workpiece from the table and cause the feed means to rotate the feed rolls to feed the workpiece periphery past the instrumentality and operative when deactuated to lower the lower feed roll to terminate the workpiece feeding; a second operating mechanism operative, when actuated, to operate the feed means at one of said speeds and operative, when deactuated, to operate the feed means at the other of said speeds; means mounting the first operating mechanism for movement with the gage; a first actuator mounted to said first operating mechanism; a second actuator mounted to said second operating mechanism; a first cam and a second cam mounted for rotation in unison about a common axis; a first leading edge and a first trailing edge on the first cam located so as to be in intersecting relation with the first actuator and defining a first angle; a second leading edge and a second trailing edge on the second cam located so as to be in intersecting relation with the actuator and defining a second angle that is greater than the first angle and is such that the first angle lies within the second angle; means for initially maintaining the cams in a position wherein the actuators are between said leading and trailing edges; drive means actuable to rotate the cams through one revolution at a prescribed speed; means responsive to the actuation of the drive means to actuate the brake to lock the gage and the first actuator against movement; means responsive to the movement of the first leading edge past the first actuator to actuate the first operating mechanism; means responsive to the movement of the second leading edge past the second actuator to actuate the second operating mechanism; means responsive to the movement of the second trailing edge past the second actuator to deactuate the second operating mechanism; means responsive to the movement of the first trailing edge past the first actuator to deactuate the first operating mechanism; and means so constructing the leading and trailing edges that the time lapse between the movements of the first leading edge and the first trailing edge past the first actuator is proportional to the distance between the first actuator and the instrumentality, the second leading edge moves past the second actuator between the movements of the first leading and trailing edges past the first actuator and after the lapse of a time interval subsequent to the movement of the first leading edge past the first actuator that is proportional to the distance between the first actuator and the instrumentality, and the second trailing edge moves past the second actuator between the movement of the second leading edge past the second actuator and the movement of the first trailing edge past the first actuator and at a time interval before the movement of the first trailing edge past the first actuator that is proportional to the distance between the first actuator and the instrumentality.

38. A machine as defined in claim 37 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means responsive to the movement of the first leading edge past the first actuator to operate the extruding means drive; means responsive to the movement of the first trailing edge past the first actuator to terminate the operation of the extruding means drive; means responsive to the movement of the second leading edge past the second actuator to cause the extruding means drive to extrude cement at the relative rate that corresponds to the relative speed that the feed means is operated at in response to the actuation of the second operating mechanism; and means responsive to the movement of the second trailing edge past the second actuator to cause the extruding means drive to extrude cement at the relative rate that corresponds to the relative speed that the feed means is operated at in response to the deactuation of the second operating mechanism.

39. A machine as defined in claim 37 further comprising: a second gage mounted for movement toward and away from the first gage and located on the opposite side of the instrumentality from the first gage; and means so connecting the gages as to enable them to concomitantly move toward and away from each other at such relative rates that, regardless of the length of the workpiece, the beginning of said portion of the workpiece is positioned at said instrumentality when the gages are in engagement with the opposite ends of the workpiece.

40. A machine as defined in claim 39 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means responsive to the movement of the first leading edge past the first actuator to operate the extruding means drive; means responsive to the movement of the first trailing edge past the first actuator to terminate the operation of the extruding means drive; means responsive to the movement of the second leading edge past the second actuator to cause the extruding means drive to extrude cement at the relative rate that corresponds to the relative speed that the feed means is operated at in response to the actuation of the second operating mechanism; and means responsive to the movement of the second trailing edge past the second actuator to cause the extruding means drive to extrude cement at the relative rate that corresponds to the relative speed that the feed means is operated at in response to the deactuation of the second operating mechanism.

41. A machine for performing work along a selected portion of the periphery of a workpiece comprising: a work performing instrumentality; feed means operable to impart relative feeding movement of the workpiece periphery with respect to the instrumentality; guide means operative to bear against the workpiece periphery during said feeding movement and guide the workpiece past the instrumentality; means mounting the instrumentality for movement in a forward-rearward path so that it may be located different distances forwardly of the guide means and inwardly of the workpiece periphery; means for initially locating the instrumentality at a predetermined position forwardly of the guide means and inwardly of the workpiece periphery; a first operating mechanism operative, when actuated, to cause the feed means to commence said feeding movement and operative, when deactuated, to terminate said feeding movement; a second operating mechanism operative, when actuated, to move the instrumentality in said path to a different position forwardly of the guide means and inwardly of the workpiece periphery; a first control mechanism so constructed as to deactuate the first operating mechanism subsequent to its actuation; and a second control mechanism so constructed as to actuate the second operating mechanism between the actuation and deactuation of the first operating mechanism.

42. A machine as defined in claim 41 wherein said instrumentality comprises: a nozzle for applying a ribbon of cement along said portion during said relative feeding movement; and extruding means operable to extrude cement through the nozzle; and further comprising: means for causing the extruding means to commence the cement extrusion concomitantly with the commencement of said feeding movement; and means so constructing the first control mechanism as to cause the termination of the cement extrusion concomitantly with the deactuation of the first operating mechanism.

43. A machine for performing work along a selected portion of the periphery of a workpiece comprising: a work performing instrumentality; feed means operable to feed the workpiece periphery past the instrumentality; guide means operative to bear against the workpiece periphery during the workpiece feed and guide the workpiece periphery past the instrumentality; means mounting the instrumentality for movement in a forward-rearward path so that it may be located different distances forwardly of the guide means and inwardly of the workpiece periphery; means for initially locating the instrumentality at a first position forwardly of the guide means and inwardly of the workpiece periphery; a first operating mechanism operative, when actuated, to cause the feed means to commence the workpiece feeding and operative, when deactuated, to terminate the workpiece feeding; a second operating mechanism operative, when actuated, to move the instrumentality in said path to a second position forwardly of the guide means and inwardly of the workpiece periphery and operative, when deactuated, to move the instrumentality in said path back to the first position; a first control mechanism so constructed as to actuate the first operating mechanism whereby the work may be performed as the workpiece periphery is fed past the instrumentality and to deactuate the first operating mechanism subsequent to its deactuation; and a second control mechanism so constructed as to actuate the second operating mechanism between the actuation and deactuation of the first operating mechanism and to deactuate the second operating mechanism between the actuation of the second operating mechanism and the deactuation of the first operating mechanism.

44. A machine as defined in claim 43 wherein said instrumentality comprises: a nozzle so located as to apply a ribbon of cement along said portion during the workpiece feeding; and extruding means operable to extrude cement through the nozzle; and further comprising: means so constructing the first control mechanism as to operate the extruding means concomitantly with the commencement of the workpiece feeding and to terminate the operation of the extruding means concomitantly with the termination of the workpiece feeding.

45. A machine as defined in claim 43 wherein said control mechanisms comprise: an actuator mounted to said first and second operating mechanisms; a first cam having a first leading edge and a first trailing edge located so as to be in intersecting relationship with the actuator; a second cam having a second leading edge and a second trailing edge located so as to be in intersecting relationship with the actuator; means for moving the first cam past the actuator and the second cam past the actuator; means responsive to the movement of the first leading edge past the actuator to actuate the first operating mechanism; means responsive to the movement of the first trailing edge past the actuator to deactuate the first operating mechanism; means responsive to the movement of the second leading edge past the actuator to actuate the second operating mechanism; means responsive to the movement of the second trailing edge past the actuator to deactuate the second operating mechanism; and means so constructing the cams and the leading and trailing edges that the second leading edge moves past the actuator between the movements of the first leading and trailing edges past the actuator, and the second trailing edge moves past the actuator between the movement of the second leading edge past the actuator and the movement of the first trailing edge past the actuator.

46. A machine as defined in claim 45 wherein said instrumentality comprises: a nozzle so located as to apply a ribbon of cement along said portion during the workpiece feeding; and extruding means operable to extrude cement through the nozzle; and further comprising: means responsive to the movement of said first leading edge past the actuator to operate the extruding means; and means responsive to the movement of said first trailing edge past the actuator to terminate the operation of the extruding means.

47. A machine for performing work along a selected portion of the periphery of a workpiece comprising: a work performing instrumentality; an upper feed roll; a lower feed roll mounted for movement towards and away from the upper feed roll; guide means located alongside the feed rolls; means for rotating the feed rolls whereby, when the lower feed roll is in an upper position, the feed rolls and guide means coact to feed the workpiece periphery past the instrumentality with the guide means bearing against the workpiece periphery and guiding the workpiece periphery past the instrumentality; means for initially maintaining the lower feed roll in a lower position; means mounting the instrumentality for movement in a forward-rearward path so that it may be located different distances forwardly of the guide means and inwardly of the workpiece periphery; means for initially locating the instrumentality at a first position forwardly of the guide means and inwardly of the workpiece periphery; a table located at such a level as to support the workpiece between the feed rolls; a first operating mechanism operative, when actuated, to raise the lower feed roll and thereby raise the workpiece from the table and cause the feed rolls to feed the workpiece periphery past the instrumentality and operative when deactuated to lower the lower feed roll to terminate the workpiece feeding; a second operating mechanism operative, when actuated, to move the instrumentality in said path to a second position forwardly of the guide means and inwardly of the workpiece periphery and operative, when deactuated, to move the instrumentality in said path back to the first position; an actuator mounted to said first and second operating mechanisms; a first cam and a second cam mounted for rotation in unison about a common axis; a first leading edge and a first trailing edge on the first cam located so as to be in intersecting relation with the actuator and defining a first angle; a second leading edge and a second trailing edge on the second cam located so as to be in intersecting relation with the actuator and defining a second angle that is greater than the first angle and is such that the first angle lies within the second angle; means for initially maintaining the cams in a position wherein the actuator is between said leading and trailing edges; drive means actuable to rotate the cams through one revolution; means responsive to the movement of the first leading edge past the actuator to actuate the first operating mechanism; means responsive to the movement of the second leading edge past the actuator to actuate the second operating mechanism; means responsive to the movement of the second trailing edge past the actuator to deactuate the second operating mechanism; means responsive to the movement of the first trailing edge past the actuator to deactuate the first operating mechanism; and means so constructing the leading and trailing edges that the second leading edge moves past the actuator between the movements of the first leading and trailing edges past the actuator, and the second trailing edge moves past the actuator between the movement of the second leading edge past the actuator and the movement of the first trailing edge past the actuator.

48. A machine as defined in claim 47 wherein said instrumentality comprises: a nozzle so located as to apply a ribbon of cement along said portion during the workpiece feeding; and extruding means operable to extrude cement through the nozzle; and further comprising: means responsive to the movement of said first leading edge past the first actuator to operate the extruding means; and means responsive to the movement of said first trailing edge past first actuator to terminate the operation of the extruding means.

49. A machine for performing work along a selected portion of the periphery of a workpiece comprising: a work performing instrumentality; feed means operable to impart relative movement of the workpiece periphery with respect to the instrumentality; at a relatively high speed and a relatively low speed; a first operating mechanism operative, when actuated, to cause the feed means to commence said feeding movement and operative, when deactuated, to terminate said feeding movement; a second operating mechanism operative, when actuated, to operate the feed means at one of said speeds and operative, when deactuated, to operate the feed means at the other of said speeds; a first control mechanism so constructed as to deactuate the first operating mechanism subsequent to its actuation; and a second control mechanism so constructed as to actuate the second operating mechanism between the actuation and deactuation of the first actuating mechanism.

50. A machine as defined in claim 49 wherein said instrumentality comprises: a nozzle for applying a ribbon of cement along said portion during said feeding movement; extruding means operable to extrude cement through the nozzle; an extruding means drive operable to effect the extrusion at a relatively high rate or at a relatively low rate; and further comprising: means for causing the extruding means drive to commence the cement extrusion concomitantly with the commencement of said feeding movement; means so constructing the first control mechanism as to cause the extruding means drive to terminate the cement extrusion concomitantly with the deactuation of the first operating mechanism; and means so connecting the second operating mechanism and the extruding means drive that when the feed means is operating at the relatively high speed the extruding means drive is effecting the extrusion at the relatively high rate and when the feed means is operating at the relatively low speed the extruding means drive is effecting the extrusion at the relatively low rate.

51. A machine for performing work along a selected portion of the periphery of a workpiece comprising: a work performing instrumentality; feed means operable to feed the workpiece periphery past the instrumentality at a relatively high speed and a relatively low speed; a first operating mechanism operative, when actuated, to cause the feed means to commence the workpiece feeding and operative, when deactuated, to terminate the workpiece feeding; a second operating mechanism operative, when actuated, to operate the feed means at one of said speeds and operative, when deactuated, to operate the feed means at the other of said speeds; a first control mechanism so constructed as to actuate the first operating mechanism whereby the work may be performed as the workpiece periphery is fed past the instrumentality and to deactuate the first operating mechanism subsequent to its actuation; and a second control mechanism so constructed as to actuate the second operating mechanism between the actuation and deactuation of the first operating mechanism and to deactuate the second operating mechanism between the actuation of the second operating mechanism and the deactuation of the first operating mechanism.

52. A machine as defined in claim 51 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means so constructing the first control mechanism as to operate the extruding means drive concomitantly with the commencement of the workpiece feeding and to terminate the operation of the extruding means drive concomitantly with the termination of the workpiece feeding; and means so connecting the second operating mechanism and the extruding means drive that when the feed means is operating at the relatively high speed the extruding means drive is effecting the extrusion at the relatively high rate and when the feed means is operating at the relatively low speed the extruding means drive is effecting the extrusion at the relatively low rate.

53. A machine as defined in claim 51 wherein said control mechanisms comprise: a first actuator mounted to said first operating mechanism; a first cam having a first leading edge and a first trailing edge located so as to be in intersecting relationship with the first actuator; a second actuator mounted to said second operating mechanism; a second cam having a second leading edge and a second trailing edge located so as to be in intersecting relationship with the second actuator; means for moving the first cam past the first actuator and the second cam past the second actuator; means responsive to the movement of the first leading edge past the first actuator to actuate the first operating mechanism; means responsive to the movement of the first trailing edge past the first actuator to deactuate the first operating mechanism; means responsive to the movement of the second leading edge past the second actuator to actuate the second operating mechanism; means responsive to the movement of the second trailing edge past the second actuator to deactuate the second operating mechanism; and means so constructing the cams and the leading and trailing edges that the second leading edge moves past the second actuator between the movements of the first leading and trailing edges past the first actuator, and the second trailing edge moves past the second actuator between the movement of the second leading edge past the second actuator and the movement of the first trailing edge past the first actuator.

54. A machine as defined in claim 53 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means responsive to the movement of the first leading edge past the first actuator to operate the extruding means drive; means responsive to the movement of the first trailing edge past the first actuator to terminate the operation of the extruding means drive; means responsive to the movement of the second leading edge past the second actuator to cause the extruding means drive to extrude cement at the relative rate that corresponds to the relative speed that the feed means is operated at in response to the actuation of the second operating mechanism; and means responsive to the movement of the second trailing edge past the second actuator to cause the extruding means drive to extrude cement at the relative rate that corresponds to the relative speed that the feed means is operated at in response to the deactuation of the second operating mechanism.

55. A mechanism for performing work along a selected portion of the periphery of a workpiece comprising: a work performing instrumentality; an upper feed roll; a lower feed roll mounted for movement towards and away from the upper feed roll; guide means located alongside the feed rolls; feed means operable to rotate the feed rolls at a relatively high speed and a relatively low speed whereby, when the lower feed roll is in an upper position, the feed rolls and the guide means coact to feed the workpiece periphery past the instrumentality at the relatively high speed or the relatively low speed; means for initially maintaining the lower feed roll in a lower position; a table located at such a level as to support the workpiece between the feed rolls; a first operating mechanism operative, when actuated, to raise the lower feed roll and thereby raise the workpiece from the table and cause the feed means to rotate the feed rolls to feed the workpiece periphery past the instrumentality and operative when deactuated to lower the lower feed roll to terminate the workpiece feeding; a second operating mechanism operative, when actuated, to operate the feed means at one of said speeds and operative, when deactuated, to operate the feed means at the other of said speeds; a first actuator mounted to said first operating mechanism; a second actuator mounted to said second operating mechanism; a first cam and a second cam mounted for rotation in unison about a common axis; a first leading edge and a first trailing edge on the first cam located so as to be in intersecting relation with the first actuator and defining a first angle; a second leading edge and a second trailing edge on the second cam located so as to be in intersecting relation with the actuator and defining a second angle that is greater than the first angle and is such that the first angle lies within the second angle; means for initially maintaining the cams in a position wherein the actuators are between said leading and trailing edges; drive means actuable to rotate the cams through one revolution; means responsive to the movement of the first leading edge past the first actuator to actuate the first operating mechanism; means responsive to the movement of the second leading edge past the second actuator to actuate the second operating mechanism; means responsive to the movement of the second trailing edge past the second actuator to deactuate the second operating mechanism; means responsive to the movement of the first trailing edge past the first actuator to deactuate the first operating mechanism; and means so constructing the leading and trailing edges that the second leading edge moves past the second actuator between the movements of the first leading and trailing edges past the first actuator and the second trailing edge moves past the second actuator between the movement of the second leading edge past the second actuator and the movement of the first trailing edge past the first actuator.

56. A machine as defined in claim 55 wherein said instrumentality comprises: a nozzle so located as to apply a ribbon of cement along said portion during the workpiece feeding; extruding means operable to extrude cement through the nozzle; an extruding means drive operable to effect the extrusion at a relatively high rate or at a relatively low rate; and further comprising: means responsive to the movement of the first leading edge past the first actuator to operate the extruding means drive; means responsive to the movement of the first trailing edge past the first actuator to terminate the operation of the extruding means drive; means responsive to the movement of the second leading edge past the second actuator to cause the extruding means drive to extrude cement at the relative rate that corresponds to the relative speed that the feed means is operated at in response to the actuation of the second operating mechanism; and means responsive to the movement of the second trailing edge past the second actuator to cause the extruding means drive to extrude cement at the relative rate that corresponds to the relative speed that the feed means is operated at in response to the deactuation of the second operating mechanism.

* * * * *